(12) United States Patent
Zhang et al.

(10) Patent No.: US 12,333,206 B2
(45) Date of Patent: Jun. 17, 2025

(54) PROJECTION METHOD AND RELATED APPARATUS

(71) Applicant: Huawei Technologies Co., Ltd., Shenzhen (CN)

(72) Inventors: Zhaoming Zhang, Shenzhen (CN); Liang Liu, Shenzhen (CN); De Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/573,209

(22) PCT Filed: Jun. 16, 2022

(86) PCT No.: PCT/CN2022/099169
§ 371 (c)(1),
(2) Date: Dec. 21, 2023

(87) PCT Pub. No.: WO2022/267974
PCT Pub. Date: Dec. 29, 2022

(65) Prior Publication Data
US 2024/0296007 A1    Sep. 5, 2024

(30) Foreign Application Priority Data
Jun. 25, 2021   (CN) .......................... 202110714876.2

(51) Int. Cl.
*G06F 3/14*    (2006.01)
*G06F 3/16*    (2006.01)
(Continued)

(52) U.S. Cl.
CPC ............ *G06F 3/1454* (2013.01); *G06F 3/165* (2013.01); *G06F 3/167* (2013.01); *G09G 5/12* (2013.01);
(Continued)

(58) Field of Classification Search
CPC ........ G06F 9/451; G06F 3/1454; G06F 3/165; G06F 3/167; H04N 21/41407;
(Continued)

(56) References Cited

U.S. PATENT DOCUMENTS 10,034,036 B2 *   7/2018  Subramanya ............ H04N 5/04
10,359,988 B2 *   7/2019  Yerli ........................ H04N 5/04
(Continued)

FOREIGN PATENT DOCUMENTS

CN    205808423 U    12/2016
CN    109032555 A    12/2018
(Continued)

*Primary Examiner* — Vinh T Lam
(74) *Attorney, Agent, or Firm* — Slater Matsil, LLP

(57) ABSTRACT

An electronic device establishes a connection to an audio device, the electronic device displays a first image, the audio device outputs audio data synchronized with the first image, the electronic device receives a projection operation, and the electronic device sends projection information of the first image to a display device based on the projection operation. The display device displays the first image based on the projection information, and the audio device outputs the audio data synchronized with the first image.

20 Claims, 13 Drawing Sheets

(51) Int. Cl.
*G09G 5/12* (2006.01)
*H04N 21/43* (2011.01)
*H04N 21/472* (2011.01)
*H04N 21/485* (2011.01)

(52) U.S. Cl.
CPC . *H04N 21/43076* (2020.08); *H04N 21/43079* (2020.08); *H04N 21/47217* (2013.01); *H04N 21/4852* (2013.01)

(58) Field of Classification Search
CPC .......... H04N 21/485; H04N 21/47217; H04N 21/4122; H04N 21/4852; H04N 21/43076; H04N 21/43079; H04N 21/4307; G09G 5/12; G09G 2370/16
See application file for complete search history.

(56) References Cited

U.S. PATENT DOCUMENTS

| | | | | |
|---|---|---|---|---|
| 10,379,731 | B2* | 8/2019 | Choi | G06F 3/0482 |
| 10,667,001 | B2* | 5/2020 | Goldberg | H04N 21/8547 |
| 10,963,211 | B2* | 3/2021 | Park | G06F 3/1454 |
| 11,048,468 | B2* | 6/2021 | Ishii | H04N 9/3147 |
| 11,310,554 | B2* | 4/2022 | Eden | H04N 21/41407 |
| 11,395,023 | B2* | 7/2022 | Rivera | G07F 17/305 |
| 11,487,558 | B2* | 11/2022 | Park | H04L 65/60 |
| 11,601,691 | B2* | 3/2023 | Galloway | H04N 21/232 |
| 11,743,561 | B2* | 8/2023 | Song | H04N 21/8547 725/144 |
| 11,812,098 | B2* | 11/2023 | Wang | H04N 21/43637 |
| 11,818,420 | B2* | 11/2023 | Wang | H04N 21/43637 |
| 11,831,942 | B2* | 11/2023 | Van Baren | H04N 21/2187 |
| 11,924,617 | B2* | 3/2024 | Ma | H04R 29/002 |
| 11,947,702 | B2* | 4/2024 | Agrawal | H04L 63/105 |
| 11,989,482 | B2* | 5/2024 | Xiong | G06F 3/04817 |
| 12,008,211 | B2* | 6/2024 | Zhang | G06F 9/451 |
| 12,160,627 | B2* | 12/2024 | Chen | H04N 21/4222 |
| 2017/0264792 | A1* | 9/2017 | Lee | G06F 3/1423 |
| 2018/0101199 | A1* | 4/2018 | Myung | G06F 1/1692 |
| 2020/0014969 | A1* | 1/2020 | Lau | H04N 21/4305 |
| 2020/0221164 | A1* | 7/2020 | Kumar | H04L 65/611 |
| 2020/0329273 | A1* | 10/2020 | Eden | H04N 21/4788 |
| 2022/0108639 | A1* | 4/2022 | Ishizu | G09G 5/12 |
| 2022/0207175 | A1* | 6/2022 | Agrawal | G06F 21/6245 |
| 2022/0224968 | A1* | 7/2022 | Wang | G06F 3/1423 |
| 2024/0296007 | A1* | 9/2024 | Zhang | G06F 9/451 |

FOREIGN PATENT DOCUMENTS

| | | |
|---|---|---|
| CN | 111031368 A | 4/2020 |
| CN | 112004173 A | 11/2020 |
| CN | 112565876 A | 3/2021 |
| CN | 112835549 A | 5/2021 |
| CN | 114125515 A | 3/2022 |
| WO | 2021083280 A1 | 5/2021 |

* cited by examiner

PROJECTION METHOD AND RELATED APPARATUS

CROSS-REFERENCE TO RELATED APPLICATIONS

This application is a National Stage of International Application No. PCT/CN2022/099169, filed on Jun. 16, 2022, which claims priority to Chinese Patent Application No. 202110714876.2, filed on Jun. 25, 2021. Both of the aforementioned applications are hereby incorporated by reference in their entireties.

TECHNICAL FIELD

This application relates to the field of electronic technologies, and in particular, to a projection method and a related apparatus.

BACKGROUND

Currently, most video players support a projection operation. An electronic device can project, by using a projection technology, a video that is originally watched by using the electronic device (including but not limited to a device such as a mobile phone or a tablet) onto a large screen (including but not limited to a television, a treadmill, or the like, which are briefly referred to as a large screen below) for play. During large-screen play, the electronic device can be idle for performing other operations. In addition, freedom from a limitation of a small screen can be achieved by using the large screen and an immersive viewing experience can be enjoyed to a greater extent.

In some scenarios, a user prefers to wear a wireless Bluetooth audio output device (including but not limited to a Bluetooth headset, a Bluetooth sound box, and the like, which are briefly referred to as an audio device below) to watch a video, that is, the electronic device plays the video, and the audio device is used as a carrier for audio output. When the user wants to project the video onto another display device with a large screen for display, the display device is used as a carrier for video play, and a speaker of the display device is naturally used as a carrier for audio play. However, when the display device is a public device such as a treadmill, or the display device is in a public place, there is a great risk of user privacy leakage when audio is played by using the display device, and an environment is noisy. Therefore, user experience is poor when audio is played by using the display device.

SUMMARY

Embodiments of this application provide a projection method and a related apparatus. In a case in which an electronic device is connected to an audio device, when the electronic device projects a display image onto a display device, the audio device can still be used to output audio data synchronized with the display image, so that user privacy in a public place is protected and user experience is improved.

According to a first aspect, this application provides a projection method, where the method includes: An electronic device establishes a connection to an audio device, where the audio device is configured to output audio of the electronic device. The electronic device displays a first image, where audio data synchronized with the first image is output by the audio device. The electronic device receives a projection operation, where the projection operation is used to project the first image onto a display device. The electronic device sends projection information of the first image to the display device in response to the projection operation, where the projection information is used by the display device to obtain display data of the first image. The display data of the first image is output by the display device, and the audio data synchronized with the first image is output by the audio device.

In embodiments of this application, when the electronic device is connected to the audio device, the audio device is a carrier for audio output of the electronic device. When the electronic device receives a projection instruction, the electronic device uses the display device as a carrier for image display, and the audio device is still used as the carrier for audio output. In this way, the display device displays an image, and a sound is output from the audio device, so that user privacy in a public place is protected and user experience is improved.

With reference to the first aspect, in some embodiments, the projection information is further used by the display device to obtain the audio data synchronized with the first image. Herein, the display device may obtain the display data and the audio data of the first image by using the received projection information. The display device may output the first image based on the display data, and the audio data is output by the audio device.

With reference to the first aspect, in some embodiments, the method further includes: The electronic device sends connection information of the audio device to the display device in response to the projection operation, where the connection information is used to establish a connection between the display device and the audio device. Herein, the electronic device provides the connection information of the audio device for the display device, and the display device establishes the connection to the audio device. In this case, the audio device is a carrier for audio output of the display device, so that when the display device displays an image, a sound is output from the audio device.

In some embodiments, the method further includes: The electronic device disconnects from the audio device in response to the projection operation.

In some embodiments, that the electronic device sends connection information of the audio device to the display device in response to the projection operation includes: The electronic device outputs first prompt information in response to the projection operation, where the first prompt information is used to prompt a user to confirm selection of the audio device for outputting audio in a projection process. When receiving a confirmation operation for the first prompt information, the electronic device sends the connection information of the audio device to the display device. Herein, only when the user determines to use the audio device to output the audio, the electronic device provides the connection information of the audio device to the display device, to output the audio from the audio device. In this way, a selection option is provided for the user, so that user experience is improved.

With reference to the first aspect, in some embodiments, the projection information includes audio indication data, and the audio indication data is used to indicate the display device to output the display data of the first image in a mute manner. If the electronic device detects that the electronic device is currently connected to the audio device, the electronic device may indicate, based on the audio indication data, the display device to output the first image in a mute manner, and then the electronic device still outputs the audio of the first image by using the audio device. In this way, the display device displays an image, and a sound is output from the audio device. Optionally, that the display device outputs the first image in a mute manner means that the display device outputs the display data of the first image but does not output the audio data synchronized with the first image.

In some embodiments, that the electronic device sends projection information of the first image to the display device in response to the projection operation includes: the electronic device outputs second prompt information in response to the projection operation, where the second prompt information is used to prompt a user to confirm selection of the audio device for outputting audio in a projection process. When receiving a confirmation operation for the second prompt information, the electronic device sends the projection information of the first image to the display device. Herein, only when the user determines to use the audio device to output the audio, the electronic device provides the projection information that carries the audio indication data to the display device, to indicate the display device to output the first image in a mute manner, and then the audio device still outputs the audio of the first image. In this way, a selection option is provided for the user, and user experience is improved.

With reference to the first aspect, in some embodiments, the projection information includes audio indication data, the audio indication data indicates that the electronic device is connected to the audio device, and the audio indication data is used to indicate the display device to prompt a user to confirm selection of the audio device for outputting audio in a projection process. If the electronic device detects that the electronic device is currently connected to the audio device, the electronic device may indicate, to the display device based on the audio indication data, that the electronic device is connected to the audio device, and then the display device determines whether to output the audio by using the audio device. Optionally, the display device may output the prompt information to the user, so that the user confirms use of the audio device for outputting the audio. In this way, a selection option is provided for the user, so that user experience is improved.

With reference to the first aspect, in some embodiments, display content of the first image is a video image of a first video displayed in full screen, the first image includes a progress bar of the first video, the progress bar is used to control play progress of the first video, and the projection information of the first image is used to obtain display data and audio data of the first video. A specific example is provided herein, that is, the first image may be a video image of the first video. When the electronic device projects the first video onto the display device, the display data of the first video is output by the display device, and the audio data of the first video is output by the audio device.

With reference to the first aspect, in some embodiments, after the electronic device sends the projection information of the first image to the display device, the method further includes: The electronic device receives a user operation on the progress bar of the first image. The electronic device controls the play progress of the first video on the display device based on the user operation. When the electronic device projects the first video onto the display device, the user may control the play progress of the first video on the electronic device, or the user may control the play progress of the first video on the display device.

According to a second aspect, this application provides a projection system, including an electronic device, an audio device, and a display device, where the electronic device establishes a connection to the audio device.

The electronic device is configured to display a first image.

The audio device is configured to output audio data synchronized with the first image.

The electronic device is further configured to receive a projection operation, where the projection operation is used to project the first image onto the display device.

The electronic device is further configured to send projection information of the first image to the display device in response to the projection operation.

The display device is further configured to obtain display data of the first image based on the projection information.

The display device is further configured to display the first image based on the display data of the first image.

The audio device is further configured to continue to output the audio data synchronized with the first image.

In embodiments of this application, when the electronic device is connected to the audio device, the audio device is a carrier for audio output of the electronic device. When the electronic device receives a projection instruction, the electronic device uses the display device as a carrier for image display, and the audio device is still used as the carrier for audio output. In this way, the display device displays an image, and a sound is output from the audio device, so that user privacy in a public place is protected and user experience is improved.

With reference to the second aspect, in some embodiments, the display device is further configured to obtain, based on the projection information, the audio data synchronized with the first image. Herein, the display device may obtain the display data and the audio data of the first image by using the received projection information. The display device may output the first image based on the display data, and the audio data is output by the audio device.

With reference to the second aspect, in some embodiments, the electronic device is further configured to send connection information of the audio device to the display device in response to the projection operation. The display device is further configured to establish a connection to the audio device based on the connection information. Herein, the electronic device provides the connection information of the audio device for the display device, and the display device establishes the connection to the audio device. In this case, the audio device is a carrier for audio output of the display device, so that when the display device displays an image, a sound is output from the audio device.

In some embodiments, the electronic device is further configured to disconnect from the audio device in response to the projection operation.

In some embodiments, the electronic device is further configured to output first prompt information in response to the projection operation, where the first prompt information is used to prompt a user to confirm selection of the audio device for outputting audio in a projection process. The electronic device is further configured to: when receiving a confirmation operation for the first prompt information, send the connection information of the audio device to the display device. Herein, only when the user determines to use the audio device to output the audio, the electronic device provides the connection information of the audio device to the display device, to output the audio from the audio device. In this way, a selection option is provided for the user, so that user experience is improved.

In some embodiments, the display device is further configured to: after outputting the display data of the first image, disconnect from the audio device. The display device is further configured to output audio synchronized with the first image. After the display device is disconnected from the audio device, the audio device is no longer used as the carrier for audio output of the display device. In this case, the audio synchronized with the first image may be output by a speaker of the display device.

With reference to the second aspect, in some embodiments, the projection information includes audio indication data, and the audio indication data is used to indicate the display device to output the display data of the first image in a mute manner. If the electronic device detects that the electronic device is currently connected to the audio device, the electronic device may indicate, based on the audio indication data, the display device to output the first image in a mute manner, and then the electronic device still outputs the audio of the first image by using the audio device. In this way, the display device displays an image, and a sound is output from the audio device. Optionally, that the display device outputs the first image in a mute manner means that the display device outputs the display data of the first image but does not output the audio data synchronized with the first image.

In some embodiments, the display device is further configured to receive an unmuting instruction after outputting the display data of the first image. The display device is further configured to output audio synchronized with the first image. When the display device receives the unmuting instruction, the audio synchronized with the first image is output by the speaker of the display device. Optionally, the audio device no longer outputs the audio synchronized with the first image.

In some embodiments, the electronic device is further configured to output second prompt information in response to the projection operation, where the second prompt information is used to prompt a user to confirm selection of the audio device for outputting audio in a projection process. When receiving a confirmation operation for the second prompt information, the electronic device sends the projection information of the first image to the display device. Herein, only when the user determines to use the audio device to output the audio, the electronic device provides the projection information that carries the audio indication data to the display device, to indicate the display device to output the first image in a mute manner, and then the audio device still outputs the audio of the first image. In this way, a selection option is provided for the user, and user experience is improved.

With reference to the second aspect, in some embodiments, the projection information includes audio indication data, and the audio indication data indicates that the electronic device is connected to the audio device. The display device is further configured to output third prompt information based on the audio indication data, where the third prompt information is used to prompt a user to confirm selection of the audio device for outputting audio in a projection process. The display device receives a confirmation operation for the third prompt information, and outputs the display data of the first image in a mute manner. If the electronic device detects that the electronic device is currently connected to the audio device, the electronic device may indicate, to the display device based on the audio indication data, that the electronic device is connected to the audio device, and then the display device determines whether to output the audio by using the audio device. Optionally, the display device may output the prompt information to the user, so that the user confirms use of the audio device for outputting the audio. In this way, a selection option is provided for the user, so that user experience is improved.

With reference to the second aspect, in some embodiments, display content of the first image is a video image of a first video displayed in full screen, the first image includes a progress bar of the first video, the progress bar is used to control play progress of the first video, and the projection information of the first image is used to obtain display data and audio data of the first video. A specific example is provided herein, that is, the first image may be a video image of the first video. When the electronic device projects the first video onto the display device, the display data of the first video is output by the display device, and the audio data of the first video is output by the audio device.

With reference to the second aspect, in some embodiments, the electronic device is further configured to: after sending the projection information of the first image to the display device, receive a user operation on the progress bar in the first image. The electronic device is further configured to control the play progress of the first video on the display device based on the user operation. When the electronic device projects the first video onto the display device, the user may control the play progress of the first video on the electronic device, or the user may control the play progress of the first video on the display device.

With reference to the second aspect, in some embodiments, the display device is further configured to display a second image before outputting the display data of the first image. The display device is further configured to display the second image and the first image, where the first image is displayed over the second image in a form of a floating window. Audio data synchronized with the second image is output by the display device, and the audio data synchronized with the first image is output by the audio device. A display form of displaying the first image in a floating window is described herein, that is, the display device simultaneously displays the second image and the first image, where the second image is an original display image of the display device, and the first image is an image projected by the electronic device onto the display device. The first image is displayed over the second image in a form of a floating window. The audio data synchronized with the second image is output by a speaker of the display device, and the audio data synchronized with the first image is output by the audio device. Optionally, a display manner of the first image may be full-screen display, split-screen display, window display, or the like. This is not limited in this application.

According to a third aspect, this application provides an electronic device, including one or more processors and one or more memories. The one or more memories are coupled to the one or more processors. The one or more memories are configured to store computer program code, and the computer program code includes computer instructions. When the computer instructions are run on the processor, the electronic device is enabled to perform the projection method in any possible implementation of any one of the foregoing aspects.

According to a fourth aspect, this application provides a display device, including one or more processors, one or more memories, and a display. The one or more memories are coupled to the one or more processors, the one or more memories are configured to store computer program code, and the computer program code includes computer instructions. When the computer instructions are run on the processor, the electronic device is enabled to perform the projection method in any possible implementation of any one of the foregoing aspects.

According to a fifth aspect, an embodiment of this application provides a computer storage medium, including computer instructions. When the computer instructions are run on an electronic device, a communications apparatus is enabled to perform the projection method according to any one of the possible implementations of any one of the foregoing aspects.

According to a sixth aspect, an embodiment of this application provides a computer program product. When the computer program product runs on a computer, the computer is enabled to perform the projection method according to any one of the possible implementations of any one of the foregoing aspects.

DETAILED DESCRIPTION OF ILLUSTRATIVE EMBODIMENTS

Figure 1:
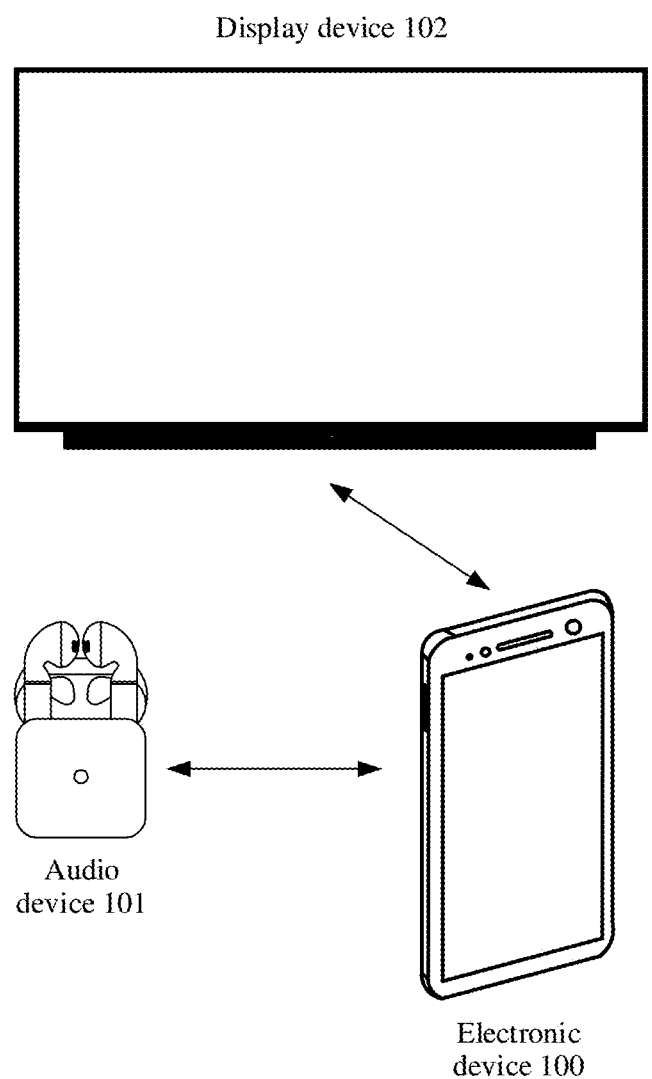
FIG. 1 is a schematic diagram of a system architecture according to an embodiment of this application.

The following describes the technical solutions in embodiments of this application with reference to the accompanying drawings. In the descriptions of embodiments of this application, unless otherwise specified, "/" indicates "or". For example, A/B may indicate A or B. The term "and/or" in this specification merely describes an association relationship for describing associated objects, and indicates that three relationships may exist. For example, A and/or B may indicate the following three cases: Only A exists, both A and B exist, and only B exists. In addition, in the descriptions of embodiments of this application, "a plurality of" means two or more.

The following terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of embodiments of this application, unless otherwise specified, "a plurality of" means two or more than two. Directions or positional relationships indicated by terms "middle", "left", "right", "up", "down", and the like are directions or positional relationships that are shown based on the accompanying drawings, and are merely used to describe this application easily and simplify the description, rather than indicate or imply that an indicated apparatus or component needs to have a specific orientation or needs to be constructed and operated in the specific orientation, and therefore cannot be understood as a limitation on this application.

An electronic device in embodiments of this application may be a mobile phone, a tablet computer, a desktop computer, a laptop computer, a notebook computer, an ultra-mobile personal computer (Ultra-mobile Personal Computer, UMPC), a handheld computer, a netbook, a personal digital assistant (Personal Digital Assistant, PDA), a virtual reality device, a PDA (Personal Digital Assistant, personal digital assistant, also referred to as palmtop computer), a portable internet device, a data storage device, a wearable device (for example, a wireless headset, a smart watch, a smart band, smart glasses, a head-mounted display (Head-mounted display, HMD), electronic clothing, an electronic bracelet, an electronic necklace, an electronic accessory, an electronic tattoo, or a smart mirror), or the like.

In some scenarios, a user prefers to wear a wireless Bluetooth audio output device (including but not limited to a Bluetooth headset, a Bluetooth sound box, and the like, which are briefly referred to as an audio device below) to watch a video, that is, the electronic device plays the video, and the audio device is used as a carrier for audio output. When the user taps on the electronic device to perform projection, the electronic device may discover a display device connected to same Wi-Fi. After the user selects the display device, the electronic device transfers information such as a URL link of a video play source, a video play time point, and member information of a video player to the display device by using Wi-Fi. A video player in the display device reloads the video and continues to play the video from the time point at which the video is projected. However, in this case, the display device is used as a carrier for video play, and a speaker of the display device is naturally used as a carrier for audio play. When the display device is a public device such as a treadmill, or the display device is in a public place, there is a great risk of user privacy leakage when audio is played by using the display device, and an environment is noisy. Therefore, user experience is poor when audio is played by using the display device.

In embodiments of this application, projection is a service or a function provided by the electronic device, and may support the electronic device in transmitting data to another device. In some embodiments, projection may be used to support the electronic device in transmitting data to a nearby device by using one or more technologies such as Bluetooth, wireless fidelity direct (wireless fidelity direct, Wi-Fi direct), and a Wi-Fi software access point (software access point, softAP). In some other embodiments, projection may be used to support the electronic device in transmitting, through a local area network (LAN), data to a device (for example, another electronic device) that is located in a same local area network as the electronic device. The device that is located in a same local area network as the electronic device may also be a device near the electronic device. A wireless projection protocol in this application includes but is not limited to Digital Living Network Alliance (Digital Living Network Alliance, DLNA), AirPlay, Miracast, and the like.

An embodiment of this application provides a projection method. In a case in which an electronic device is connected to an audio device, when the electronic device receives a projection instruction, a large screen is used as a carrier for video play, and the audio device is used as a carrier for audio output. In this way, the large screen plays a video, and a sound is output from the audio device that is connected to the electronic device, so that user privacy in a public place is protected and user experience is improved.

For example, FIG. 1 is a diagram of a system according to this application.

As shown in FIG. 1, the system may include an electronic device 100, an audio device 101, and a display device 102. The electronic device 100 and the audio device 101 may be connected in a wired or wireless communication manner. The electronic device 100 and the display device 102 may be connected in a wired or wireless communication manner. The wireless communication manner may include, for example, Bluetooth (blue tooth, BT), near field communication (near field communication, NFC), wireless fidelity (wireless fidelity, Wi-Fi), or Wi-Fi direct.

The audio device 101 includes an electronic device that has an audio play function, such as a Bluetooth headset, a Bluetooth sound box, a wired headset, a smart watch, or a smart band. The display device 102 includes an electronic device that has a display, such as a television, a computer, a tablet, an iPad, a mobile phone, an in-vehicle device, or a treadmill.

The following first describes the electronic device 100 in this embodiment of this application.

Figure 2A:
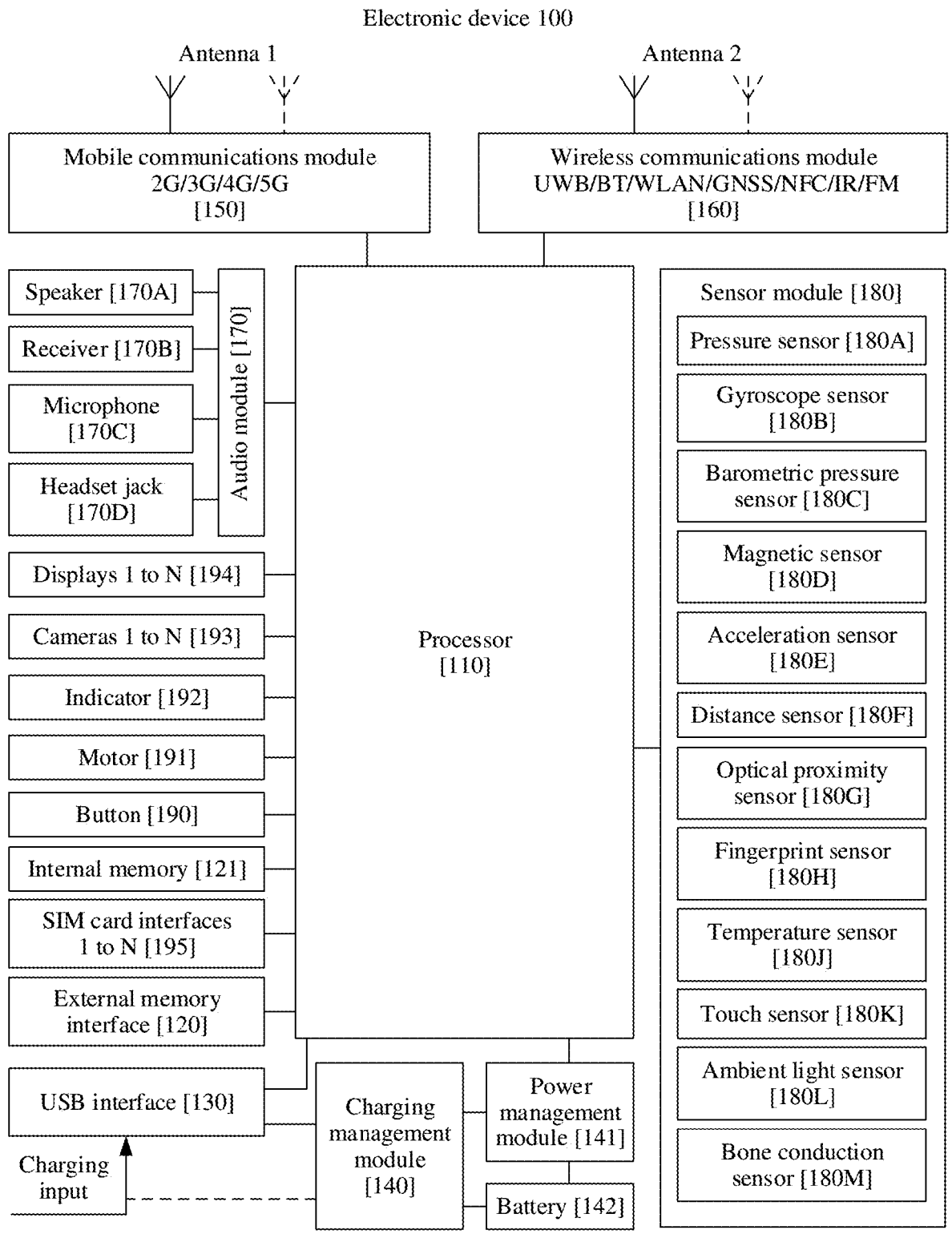
FIG. 2a is a schematic diagram of a structure of an electronic device according to an embodiment of this application.

FIG. 2a is a schematic diagram of a structure of an example of an electronic device 100 according to an embodiment of this application.

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application does not constitute a specific limitation on the electronic device 100. In some other embodiments of this application, the electronic device 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may be a nerve center and a command center of the electronic device 100. The controller may generate an operation control signal based on an instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store an instruction or data that has been used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes one serial data line (serial data line, SDA) and one serial clock line (derail clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communications module 160 through the I2S interface, to implement a function of answering a call by using a Bluetooth headset.

The PCM interface may also be used to perform audio communication, and sample, quantize, and code an analog signal. In some embodiments, the audio module 170 may be coupled to the wireless communications module 160 through a PCM bus interface. In some embodiments, the audio module 170 may also transmit an audio signal to the wireless communications module 160 through the PCM interface, to implement a function of answering a call by using a Bluetooth headset. Both the I2S interface and the PCM interface may be used for audio communication.

The UART interface is a universal serial data bus, and is configured to perform asynchronous communication. The bus may be a two-way communications bus. The bus converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music by using a Bluetooth headset.

The MIPI interface may be configured to connect the processor 110 to a peripheral component such as the display 194 or the camera 193. The MIPI interface includes a camera serial interface (camera serial interface, CSI), a display serial interface (display serial interface, DSI), and the like. In some embodiments, the processor 110 communicates with the camera 193 through the CSI, to implement a photographing function of the electronic device 100. The processor 110 communicates with the display 194 through the DSI interface, to implement a display function of the electronic device 100.

The GPIO interface may be configured by software. The GPIO interface may be configured as a control signal or a data signal. In some embodiments, the GPIO interface may be configured to connect the processor 110 to the camera 193, the display 194, the wireless communications module 160, the audio module 170, the sensor module 180, or the like. The GPIO interface may alternatively be configured as an I2C interface, an I2S interface, a UART interface, an MIPI interface, or the like.

The USB interface 130 is an interface that conforms to a USB standard specification, and may be specifically a mini USB interface, a micro USB interface, a USB Type-C interface, or the like. The USB interface 130 may be configured to connect to a charger to charge the electronic device 100, or may be configured to transmit data between the electronic device 100 and a peripheral device, or may be configured to connect to a headset for playing audio by using the headset. The interface may be further configured to connect to another electronic device such as an AR device.

It may be understood that an interface connection relationship between the modules illustrated in this embodiment of this application is merely an example for description, and constitutes no limitation on the structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive a charging input from the charger. The charger may be a wireless charger or a wired charger. In some embodiments of wired charging, the charging management module 140 may receive a charging input of a wired charger through the USB interface 130. In some embodiments of wireless charging, the charging management module 140 may receive a wireless charging input through a wireless charging coil of the electronic device 100. The charging management module 140 supplies power to the electronic device by using the power management module 141 while charging the battery 142.

The power management module 141 is configured to connect to the battery 142, the charging management module 140, and the processor 110. The power management module 141 receives input of the battery 142 and/or the charging management module 140, to supply power to the processor 110, the internal memory 121, an external memory, the display 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented by using the antenna 1, the antenna 2, the mobile communications module 150, the wireless communications module 160, the modem processor, the baseband processor, and the like.

The antenna 1 and the antenna 2 are configured to transmit and receive an electromagnetic wave signal. Each antenna in the electronic device 100 may be configured to cover one or more communications frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communications module 150 may provide a wireless communication solution that includes 2G/3G/4G/5G or the like and that is applied to the electronic device 100. The mobile communications module 150 may include at least one filter, a switch, a power amplifier, a low noise amplifier (low noise amplifier, LNA), and the like. The mobile communications module 150 may receive an electromagnetic wave by using the antenna 1, perform processing such as filtering or amplification on the received electromagnetic wave, and transmit the electromagnetic wave to the modem processor for demodulation. The mobile communications module 150 may further amplify a signal modulated by the modem processor, and convert the signal into an electromagnetic wave for radiation by using the antenna 1. In some embodiments, at least some functional modules in the mobile communications module 150 may be disposed in the processor 110. In some embodiments, at least some functional modules of the mobile communications module 150 and at least some modules of the processor 110 may be disposed in a same device.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by an audio device (which is not limited to the speaker 170A, the receiver 170B, or the like), or displays an image or a video by the display 194. In some embodiments, the modem processor may be an independent component. In some other embodiments, the modem processor may be independent of the processor 110, and is disposed in a same device as the mobile communications module 150 or another functional module.

The wireless communications module 160 may provide a wireless communication solution that is applied to the electronic device 100, and that includes UWB, a wireless local area network (wireless local area networks, WLAN)

(for example, a wireless fidelity (wireless fidelity, Wi-Fi) network), Bluetooth (bluetooth, BT), a global navigation satellite system (global navigation satellite system, GNSS), frequency modulation (frequency modulation, FM), a near field communication (near field communication, NFC) technology, an infrared (infrared, IR) technology, or the like. The wireless communications module 160 may be one or more components integrating at least one communications processing module. The wireless communications module 160 receives an electromagnetic wave by the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation by using the antenna 2.

In some embodiments, a Bluetooth (BT) module and a WLAN module included in the wireless communications module 160 may transmit a signal to detect or scan a device near the electronic device 100, so that the electronic device 100 can discover a nearby device by using a wireless communications technology such as Bluetooth or a WLAN, establish a wireless communication connection to the nearby device, and share data with the nearby device by using the connection. The Bluetooth (BT) module may provide a Bluetooth communication solution including one or more of classic Bluetooth (Bluetooth 2.1) or Bluetooth low energy (Bluetooth low energy, BLE). The WLAN module may provide a WLAN communication solution including one or more of Wi-Fi direct, a Wi-Fi LAN, or Wi-Fi SoftAP.

In some embodiments, the wireless communication solution provided by the mobile communications module 150 may enable the electronic device to communicate with a device (for example, a server) in a network, and the WLAN wireless communication solution provided by the wireless communications module 160 may also enable the electronic device to communicate with a device (for example, a server) in a network, and to communicate with a cloud device by using the device (for example, the server) in the network. In this way, the electronic device can discover the cloud device and transmit data to the cloud device.

In some embodiments, the antenna 1 and the mobile communications module 150 in the electronic device 100 are coupled, and the antenna 2 and the wireless communications module 160 in the electronic device 100 are coupled, so that the electronic device 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation systems, SBAS).

The electronic device 100 may implement a display function by using the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a mini-LED, a micro-LED, a micro-OLED, a quantum dot light emitting diode (quantum dot light emitting diodes, QLED), or the like. In some embodiments, the electronic device 100 may include one or N displays 194, where N is a positive integer greater than 1.

In some embodiments of this application, the display 194 displays interface content currently output by a system. For example, the interface content is an interface provided by an instant messaging application.

The electronic device 100 may implement a photographing function by using the ISP, the camera 193, the video codec, the GPU, the display 194, the application processor and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The light-sensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transformation on frequency energy.

The video codec is configured to compress or decompress a digital video. The electronic device 100 may support one or more video codecs. In this way, the electronic device 100 may play or record videos in a plurality of coding formats, for example, moving picture experts group (moving picture experts group, MPEG)-1, MPEG-2, MPEG-3, and MPEG-4.

The NPU is a neural-network (neural-network, NN) computing processor, quickly processes input information by referring to a structure of a biological neural network, for example, by referring to a mode of transmission between human brain neurons, and may further continuously perform self-learning. Applications such as intelligent cognition of the electronic device 100 may be implemented by using the NPU, for example, image recognition, facial recognition, speech recognition, and text understanding.

The external memory interface 120 may be used to connect to an external storage card, for example, a micro SD card, to extend a storage capability of the electronic device 100. The external memory card communicates with the processor 110 through the external memory interface 120, to implement a data storage function. For example, files such as music and videos are stored in the external storage card.

The internal memory 121 may be configured to store computer-executable program code. The executable program code includes instructions. The processor 110 runs the instructions stored in the internal memory 121, to perform various function applications of the electronic device 100 and data processing. The internal memory 121 may include a program storage area and a data storage area. The program storage area may store an operating system, an application required by at least one function (for example, a voice play function or an image play function), and the like. The data storage area may store data (such as audio data and an address book) created during use of the electronic device 100, and the like. In addition, the internal memory 121 may include a high-speed random access memory, or may include a nonvolatile memory, for example, at least one magnetic disk storage device, a flash memory, or a universal flash storage (universal flash storage, UFS).

The electronic device 100 may implement an audio function, for example, music playing and recording, by using the audio module 170, the speaker 170A, the receiver 170B, the microphone 170C, the headset jack 170D, the application processor, and the like.

The audio module 170 is configured to convert digital audio information into an analog audio signal for output, and is also configured to convert analog audio input into a digital audio signal. The audio module 170 may be further configured to code and decode an audio signal. In some embodiments, the audio module 170 may be disposed in the processor 110, or some functional modules in the audio module 170 are disposed in the processor 110.

The speaker 170A, also referred to as a "loudspeaker", is configured to convert an audio electrical signal into a sound signal. The electronic device 100 may be used to listen to music or answer a call in a hands-free mode over the speaker 170A.

The receiver 170B, also referred to as an "earpiece", is configured to convert an electrical audio signal into a sound signal. When a call is answered or speech information is received by using the electronic device 100, the receiver 170B may be put close to a human ear to listen to a voice.

The microphone 170C, also referred to as a "mike" or a "mic", is configured to convert a sound signal into an electrical signal. When making a call or sending a voice message, a user may make a sound near the microphone 170C by using a mouth of the user, to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, and identify a sound source, so as to implement a directional recording function and the like.

The headset jack 170D is configured to connect to a wired headset. The headset jack 170D may be a USB interface 130, or may be a 3.5 mm open mobile terminal platform (open mobile terminal platform, OMTP) standard interface or cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display 194. In some optional embodiments of this application, the pressure sensor 180A may be configured to: capture a pressure value generated when a finger part of the user contacts the display, and transmit the pressure value to the processor, so that the processor identifies a finger part by using which the user enters the user operation.

There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on the change in the capacitance. When a touch operation is performed on the display 194, the electronic device 100 detects intensity of the touch operation by using the pressure sensor 180A. The electronic device 100 may also calculate a touch location based on a detection signal of the pressure sensor 180A. In some embodiments, different touch locations may correspond to different operation instructions. In some optional embodiments, the pressure sensor 180A may further calculate a quantity of touch points based on a detected signal, and transmit a calculated value to the processor, so that the processor identifies that the user enters a user operation by using a single finger or a plurality of fingers.

The gyroscope sensor 180B may be configured to determine a moving posture of the electronic device 100. In some embodiments, an angular velocity of the electronic device 100 around three axes (that is, axes X, Y, and Z of the electronic device) may be determined by using the gyroscope sensor 180B. The gyroscope sensor 180B may be configured to implement image stabilization during photographing. For example, when the shutter is pressed, the gyroscope sensor 180B detects an angle at which the electronic device 100 jitters, calculates, based on the angle, a distance for which a lens module needs to compensate, and allows the lens to cancel the jitter of the electronic device 100 through reverse motion, to implement image stabilization. The gyroscope sensor 180B may also be used in a navigation scenario and a somatic game scenario.

The barometric pressure sensor 180C is configured to measure barometric pressure. In some embodiments, the electronic device 100 calculates an altitude by using the barometric pressure measured by the barometric pressure sensor 180C, to assist in positioning and navigation.

The magnetic sensor 180D includes a Hall sensor. The electronic device 100 may detect opening and closing of a flip cover by using the magnetic sensor 180D. In some embodiments, when the electronic device 100 is a clamshell phone, the electronic device 100 may detect opening and closing of a flip cover based on the magnetic sensor 180D. Further, a feature such as automatic unlocking of the flip cover is set based on a detected opening or closing state of the leather case or a detected opening or closing state of the flip cover.

The acceleration sensor 180E may detect accelerations in various directions (usually on three axes) of the electronic device 100. When the electronic device 100 is still, a magnitude and a direction of gravity may be detected. The acceleration sensor 180E may be further configured to identify a posture of the electronic device, and is used in an application such as switching between a landscape mode and a portrait mode or a pedometer. In some optional embodiments of this application, the acceleration sensor 180E may be configured to capture an acceleration value generated when a finger part of the user touches the display (or a finger of the user taps a rear frame of a rear housing of the electronic device 100), and transmit the acceleration value to the processor, so that the processor identifies a finger part by using which the user inputs the user operation.

The distance sensor 180F is configured to measure a distance. The electronic device 100 may measure the distance in an infrared manner or a laser manner. In some embodiments, in a photographing scenario, the electronic device 100 may measure a distance by using the distance sensor 180F to implement quick focusing.

The optical proximity sensor 180G may include, for example, a light emitting diode (LED) and an optical detector, for example, a photodiode. The light emitting diode may be an infrared light emitting diode. The electronic device 100 emits infrared light by using the light-emitting diode. The electronic device 100 detects infrared reflected light from a nearby object by using the photodiode. When sufficient reflected light is detected, it may be determined that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear to make a call, to automatically perform screen-off for power saving. The optical proximity sensor 180G may also be used in a smart cover mode or a pocket mode to automatically perform screen unlocking or locking.

The ambient light sensor 180L is configured to sense ambient light brightness. The electronic device 100 may adaptively adjust brightness of the display 194 based on the sensed ambient light brightness. The ambient light sensor 180L may also be configured to automatically adjust white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy by using the temperature detected by the temperature sensor 180J. For example, when a temperature reported by the temperature sensor 180J exceeds a threshold, the electronic device 100 lowers performance of a processor nearby the temperature sensor 180J, to reduce power consumption for thermal protection. In some other embodiments, when the temperature is less than another threshold, the electronic device 100 heats the battery 142 to prevent the electronic device 100 from being shut down abnormally due to a low temperature. In some other embodiments, when the temperature is lower than still another threshold, the electronic device 100 boosts an output voltage of the battery 142 to avoid abnormal shutdown caused by a low temperature.

The touch sensor 180K is also referred to as a touch panel. The touch sensor 180K may be disposed on the display 194, and the touch sensor 180K and the display 194 form a touchscreen, which is also referred to as a "touch screen". The touch sensor 180K is configured to detect a touch operation performed on or near the touch sensor 180K. The touch operation is an operation that the user contacts the display 194 by using a hand, an elbow, a stylus, or the like. The touch sensor may transfer the detected touch operation to the application processor to determine a type of the touch event. A visual output related to the touch operation may be provided through the display 194. In some other embodiments, the touch sensor 180K may also be disposed on a surface of the electronic device 100 at a location different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a body pulse to receive a blood pressure beating signal. In some embodiments, the bone conduction sensor 180M may also be disposed in the headset, to obtain a bone conduction headset. The audio module 170 may obtain a speech signal through parsing based on the vibration signal that is of the vibration bone of the vocal-cord part and that is obtained by the bone conduction sensor 180M, to implement a speech function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a key input, and generate a key signal input related to a user setting and function control of the electronic device 100.

The motor 191 may generate a vibration prompt. The motor 191 may be configured to provide an incoming call vibration prompt and a touch vibration feedback. For example, touch operations performed on different applications (for example, photographing and audio play) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100.

Figure 2B:
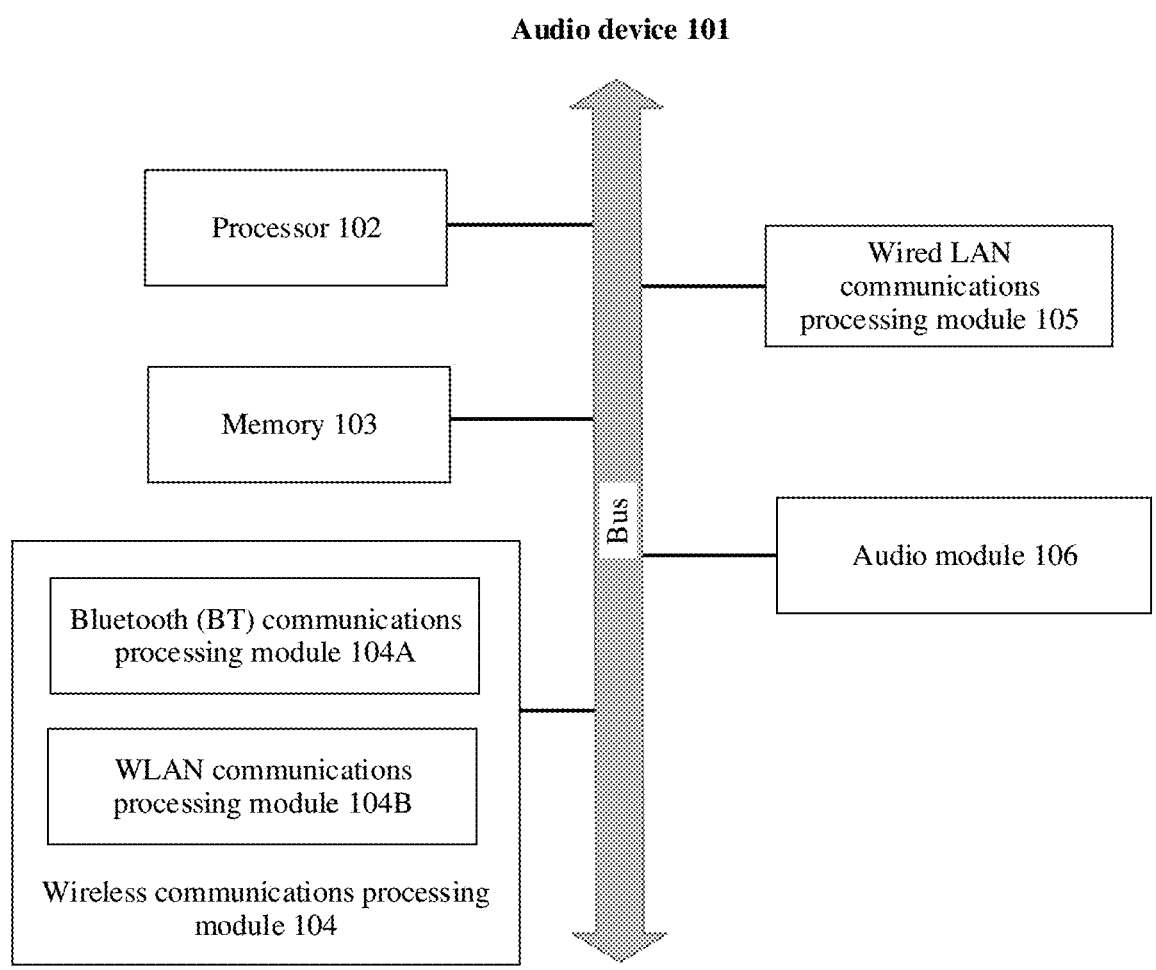
FIG. 2b is a schematic diagram of a structure of an audio device according to an embodiment of this application.

FIG. 2b shows an example of a schematic diagram of a structure of an audio device 101 according to this application.

As shown in FIG. 2b, the audio device 101 may include: a processor 102, a memory 103, a wireless communications processing module 104, a wired LAN communications processing module 105, and an audio module 106.

The processor 102 may be configured to read and execute computer-readable instructions. During specific implementation, the processor 102 may mainly include a controller, an arithmetic unit, and a register. The controller is mainly responsible for decoding instructions and sending a control signal for an operation corresponding to the instructions. The arithmetic unit is mainly responsible for performing a fixed-point or floating-point arithmetic operation, a shift operation, a logic operation, and the like, and may also perform an address operation and address translation. The register is mainly responsible for saving a register operand, an intermediate operation result, and the like that are temporarily stored during instruction execution. During specific implementation, a hardware architecture of the processor 102 may be an application-specific integrated circuit (Application Specific Integrated Circuits, ASIC) architecture, an MIPS architecture, an ARM architecture, an NP architecture, or the like.

In some embodiments, the processor 102 may be configured to parse signals/a signal received by the wireless communications processing module 104 and/or the wired LAN communications processing module 105, for example, a probe request broadcast by the electronic device 100, or an audio output request sent by the electronic device 100. The processor 102 may be configured to perform a corresponding processing operation based on a parsing result, for example, generate a probe response, or drive, based on the audio output request or an audio output instruction, the audio module 106 to perform audio output.

In some embodiments, the processor 102 may be further configured to generate signals/a signal sent by the wireless communications processing module 104 and/or the wired LAN communications processing module 105, for example, a Bluetooth broadcast signal, a beacon signal, or a signal that is sent to the electronic device and that is used to feed back a connection status (for example, a connection success or a connection failure).

The memory 103 is coupled to the processor 102, and is configured to store various software programs and/or a plurality of sets of instructions. In specific implementation, the memory 103 may include a high-speed random access memory, and may also include a non-volatile memory, for example, one or more magnetic disk storage devices, flash devices, or other non-volatile solid-state storage devices. The memory 103 may store an operating system, for example, an embedded operating system such as uCOS, VxWorks, or RTLinux. The memory 103 may further store a communication program, and the communication program may be used to communicate with the electronic device 100, one or more servers, or a nearby device.

The wireless communications processing module 104 may include one or more of a Bluetooth (BT) communications processing module 104A and a WLAN communications processing module 104B.

In some embodiments, the one or more of the Bluetooth (BT) communications processing module and the WLAN communications processing module may obtain, through listening, a signal transmitted by another device (for example, the electronic device 100), for example, a probe request or a scan signal; and may send a response signal, for example, a probe response or a scan response, so that the another device (for example, the electronic device 100) can discover the audio device 101; establish a wireless communication connection to the another device (for example, the electronic device 100); and communicate with the another device (for example, the electronic device 100) by using one or more wireless communications technologies such as Bluetooth or a WLAN.

In some other embodiments, the one or more of the Bluetooth (BT) communications processing module and the WLAN communications processing module may alternatively transmit a signal, for example, a broadcast Bluetooth signal or a beacon signal, so that another device (for example, the electronic device 100) can discover the display device 102; establish a wireless communication connection to the another device (for example, the electronic device 100); and communicate with the another device (for example, the electronic device 100) by using one or more wireless communications technologies such as Bluetooth or a WLAN.

The wired LAN communications processing module 105 may be configured to communicate with another device in a same wired LAN through the LAN, and may be further configured to connect to a WAN by using the wired LAN, and communicate with a device in the WAN.

The audio module 106 may be configured to output an audio signal through an audio output interface, so that the audio device 101 can support audio playing. The audio module 106 may be configured to receive audio data through an audio input interface.

It may be understood that the structure shown in FIG. 2b does not constitute a specific limitation on the audio device 101. In some other embodiments of this application, the audio device 101 may include more or fewer components than those shown in the figure, or some components may be combined, or some components may be split, or different component arrangements may be used. The components shown in the figure may be implemented by hardware, software, or a combination of software and hardware.

Figure 2C:
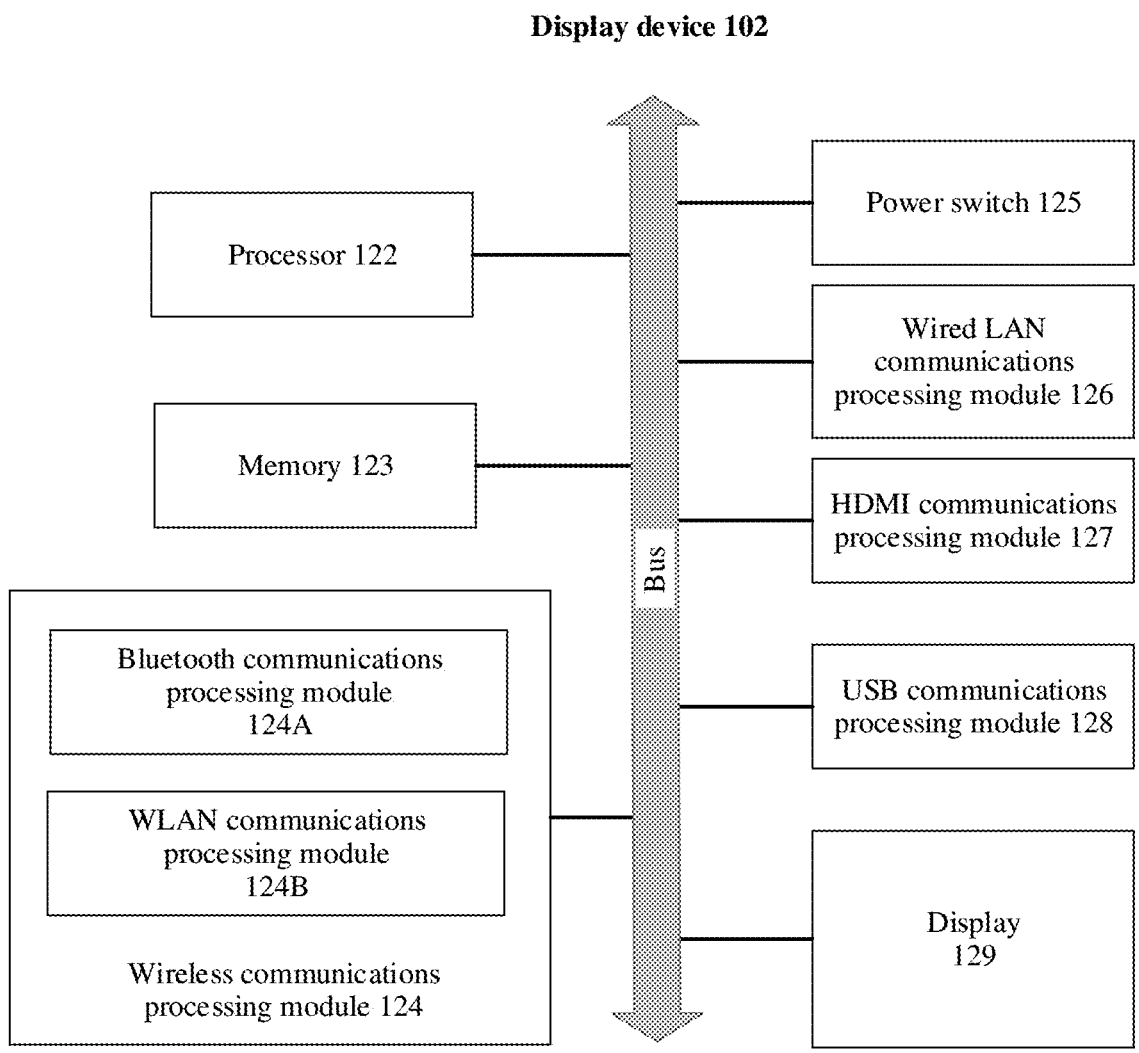
FIG. 2c is a schematic diagram of a structure of a display device according to an embodiment of this application.

FIG. 2c shows an example of a schematic diagram of a structure of a display device 102 according to this application.

As shown in FIG. 2c, the display device 102 may include a processor 122, a memory 123, a wireless communications processing module 124, a power switch 125, a wired LAN communications processing module 126, an HDMI communications processing module 127, a USB communications processing module 128, and a display 129.

The processor 122 may be configured to read and execute computer-readable instructions. In specific implementation, the processor 122 may mainly include a controller, an arithmetic unit, and a register. The controller is mainly responsible for decoding instructions and sending a control signal for an operation corresponding to the instructions. The arithmetic unit is mainly responsible for performing a fixed-point or floating-point arithmetic operation, a shift operation, a logic operation, and the like, and may also perform an address operation and address translation. The register is mainly responsible for saving a register operand, an intermediate operation result, and the like that are temporarily stored during instruction execution. During specific implementation, a hardware architecture of the processor 122 may be an application-specific integrated circuit (Application Specific Integrated Circuits, ASIC) architecture, an MIPS architecture, an ARM architecture, an NP architecture, or the like.

In some embodiments, the processor 122 may be configured to parse signals/a signal received by the wireless communications processing module 124 and/or the wired LAN communications processing module 126, for example, a probe request that is broadcast by the electronic device 100, a display request sent by the electronic device 100, and a display instruction sent by a server of a cloud projection service provider. The processor 122 may be configured to perform a corresponding processing operation based on a parsing result, for example, generate a probe response, or drive, based on the display request or a display instruction, the display to perform displaying.

In some embodiments, the processor 122 may be further configured to generate signals/a signal sent by the wireless communications processing module 124 and/or the wired LAN communications processing module 126, for example, a Bluetooth broadcast signal, a beacon signal, or a signal that is sent to the electronic device and that is used to feed back a display status (for example, a display success or a display failure).

The memory 123 is coupled to the processor 122, and is configured to store various software programs and/or a plurality of sets of instructions. In specific implementation, the memory 123 may include a high-speed random access memory, and may further include a nonvolatile memory, for example, one or more magnetic disk storage devices, a flash memory device, or another nonvolatile solid-state storage device. The memory 123 may store an operating system, for example, an embedded operating system such as uCOS, VxWorks, or RTLinux. The memory 123 may further store a communication program, and the communication program may be used to communicate with the electronic device 100, one or more servers, or a nearby device.

The wireless communications processing module 124 may include one or more of a Bluetooth (BT) communications processing module 124A and a WLAN communications processing module 124B.

In some embodiments, the one or more of the Bluetooth (BT) communications processing module and the WLAN communications processing module may obtain, through listening, a signal transmitted by another device (for example, the electronic device 100), for example, a probe request or a scan signal; may send a response signal, for example, a probe response or a scan response, so that the another device (for example, the electronic device 100) can discover the display device 102; establish a wireless communication connection to the another device (for example, the electronic device 100); and communicate with the another device (for example, the electronic device 100) by using one or more wireless communications technologies such as Bluetooth or a WLAN.

In some other embodiments, the one or more of the Bluetooth (BT) communications processing module and the WLAN communications processing module may alternatively transmit a signal, for example, a broadcast Bluetooth signal or a beacon signal, so that another device (for example, the electronic device 100) can discover the display device 102; establish a wireless communication connection to the another device (for example, the electronic device 100); and communicate with the another device (for example, the electronic device 100) by using one or more wireless communications technologies such as Bluetooth or a WLAN.

The wireless communications processing module 124 may further include a cellular mobile communications processing module (not shown). The cellular mobile communications processing module may communicate with another device (for example, a server) by using a cellular mobile communications technology.

The power switch 125 may be configured to control a power supply to supply power to the display 121.

The wired LAN communications processing module 126 may be configured to communicate with another device in a same wired LAN through the LAN, and may be further configured to connect to a WAN by using the wired LAN, and may communicate with a device in the WAN.

The HDMI communications processing module 127 may be configured to communicate with another device through an HDMI interface (not shown).

The USB communications processing module 128 may be configured to communicate with another device through a USB interface (not shown).

The display 129 may be configured to display an image, a video, and the like. The display 129 may be a liquid crystal display (liquid crystal display, LCD), an organic light-emitting diode (organic light-emitting diode, OLED) display, an active-matrix organic light emitting diode (active-matrix organic light emitting diode, AMOLED) display, a flexible light-emitting diode (flexible light-emitting diode, FLED) display, a quantum dot light emitting diode (quantum dot light emitting diodes, QLED) display, or the like.

In some embodiments, the display device 102 may further include an audio module (not shown). The audio module may be configured to output an audio signal through an audio output interface, so that the display device 102 can support audio play. The audio module may be further configured to receive audio data through the audio input interface. The display device 102 may be a media play device such as a television set.

In some embodiments, the display device 102 may further include a serial interface, for example, an RS-232 interface. The serial interface may be connected to another device, for example, an audio speaker device such as a sound box, so that the display collaborates with the audio speaker device to play audio and a video.

It may be understood that the structure shown in FIG. 2c does not constitute a specific limitation on the display device 102. In some other embodiments of this application, the display device 102 may include more or fewer components than those shown in the figure, or some components may be combined, or some components may be split, or different component arrangements may be used. The components shown in the figure may be implemented by hardware, software, or a combination of software and hardware.

Based on the foregoing system architecture and the structures of the devices, the following describes, with reference to examples, an implementation principle of a projection method provided in embodiments of this application.

Figure 3:
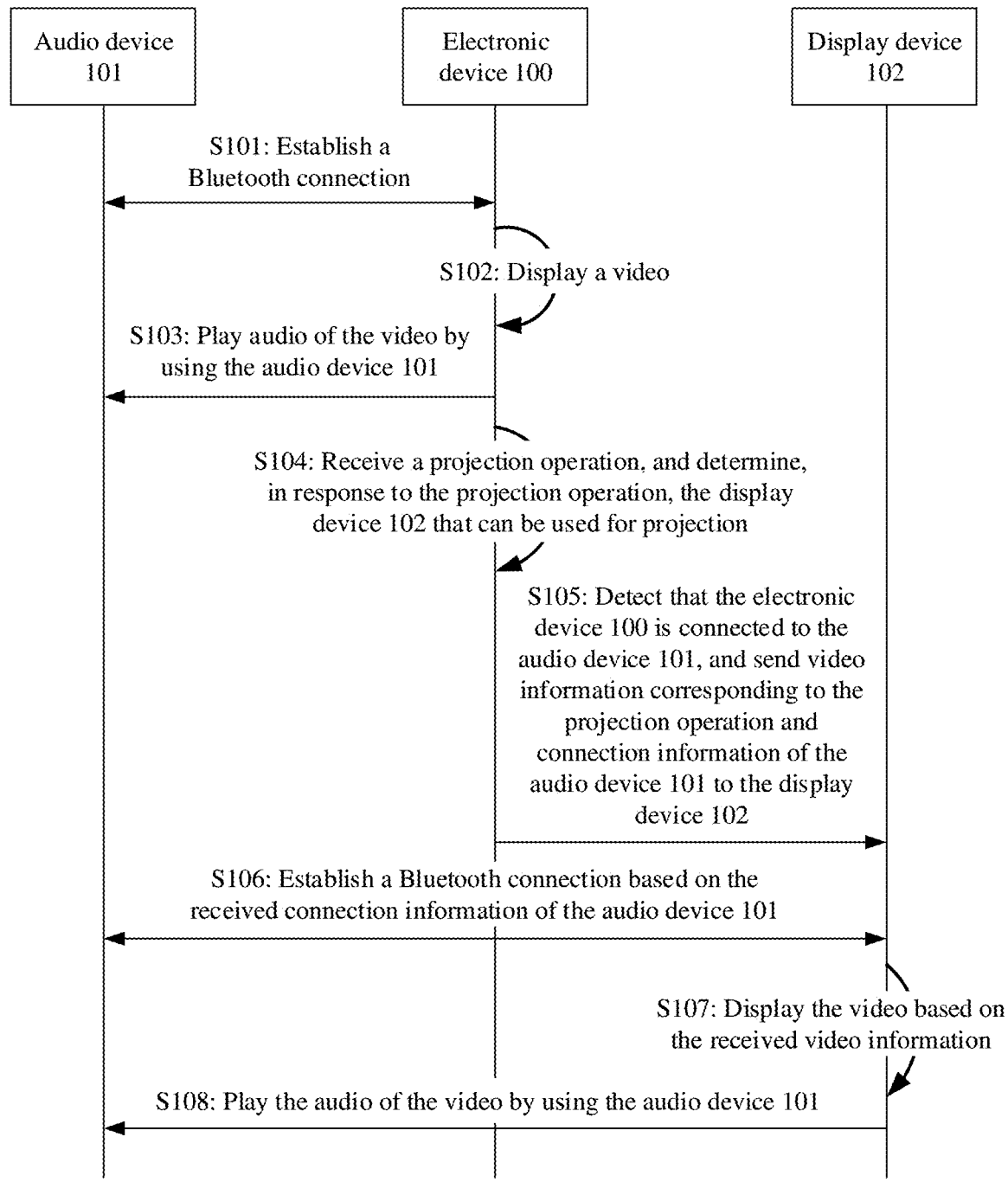
FIG. 3 is a method flowchart of a projection method according to an embodiment of this application.

FIG. 3 is a flowchart of steps of a projection method.

Step S101: An electronic device 100 establishes a Bluetooth connection to an audio device 101.

When the electronic device 100 is connected to the audio device 101 for the first time (not paired), after a Bluetooth function is enabled on the electronic device 100, the electronic device 100 may send an inquiry request (inquiry request) to the surroundings. When the audio device 101 enters an inquiry scan (inquiry scan) state, the audio device 101 may scan and find the inquiry request sent by the electronic device 100. After finding the inquiry request of the electronic device 100, the audio device 101 may return an inquiry response (inquiry response) to the electronic device 100. In this case, the electronic device 100 may display a device option of the audio device 101 on a Bluetooth device interface. After a user selects the device option of the audio device 101, the electronic device 100 may send a page request (page request) to the audio device 101. The audio device 101 may listen to the page request from the electronic device 100 at a frequency-hopping frequency in a fixed time window at a fixed cycle. After obtaining the page request from the electronic device 100 through listening, the audio device 101 may send a slave page response (slave page response) to the electronic device 100 in a next time slot. After receiving the slave page response from the audio device 101, the electronic device 100 may send a master page response (master page response) to the audio device 101 in a next time slot. Then, the audio device 101 and the electronic device 100 may enter a connected state, establish an ACL link connection, and complete pairing. After the electronic device 100 completes pairing with the audio device 101, a connection (for example, an audio/video distribution transport protocol (audio/video distribution transport protocol, AVDTP)-based connection, or a hands-free profile (Hands-free Profile, HFP)-based connection for voice data transmission) used for data transmission may be established based on a Bluetooth capability supported by the electronic device 100 and the audio device 101.

Pairing between the electronic device 100 and the audio device 101 may be a link manager protocol (link manager protocol, LMP) pairing, may be secure simple pairing (secure simple pairing, SSP), or may be another non-standard pairing method. After pairing between the electronic device 100 and the audio device 101 is completed, a shared key: a link key (link key), may be created. The link key (link key) may be used to perform mutual authentication and encrypt exchanged data.

When the electronic device 100 is not connected to the audio device 101 for the first time (the electronic device 100 and the audio device 101 were paired), both the electronic device 100 and the audio device 101 store information such as a link key (link key) or a MAC address shared by the two parties. When the electronic device 100 enables a Bluetooth function and the audio device 101 is powered on, the audio device 101 may actively send a page request to the electronic device 100. The electronic device 100 may listen to the page request from the audio device 101 at a frequency-hopping frequency in a fixed time window at a fixed cycle. After obtaining the page request from the audio device 101 through listening, the electronic device 100 may send a slave page response (slave page response) to the audio device 101 in a next time slot. After receiving the slave page response from the electronic device 100, the audio device 101 may send a master page response (master page response) to the electronic device 100 in a next time slot. Then, the electronic device 100 and the audio device 101 may enter a connected state, establish an ACL link connection, and complete link key (link key) authentication. After the electronic device 100 completes authentication with the audio device 101, a connection (for example, an audio/video distribution transport protocol (audio/video distribution transport protocol, AVDTP)-based connection, or a hands-free profile (Hands-free Profile, HFP)-based connection for voice data transmission) used for audio data transmission may be established based on the Bluetooth capability supported by the electronic device 100 and the audio device 101.

The Bluetooth connection is an example of a communication manner in this application, and a connection manner between the electronic device 100 and the audio device 101 may alternatively be other short-range communication such as Wi-Fi direct, radio frequency identification (RFID), or the like.

Step S102: The electronic device 100 displays a video.

Step S103: The electronic device 100 plays audio of the video by using the audio device 101.

In this case, because the electronic device 100 establishes a connection to the audio device 101, the audio device 101 outputs the audio of the video, and the electronic device 100 displays an image of the video.

Step S104: The electronic device 100 receives a projection operation, and determines, in response to the projection operation, a display device 102 that can be used for projection.

The electronic device 100 receives the projection operation for the video, and the electronic device 100 may find the display device 102 that can be used for projection. The projection operation is used to project the video onto the display device 102 for play.

Optionally, the electronic device 100 receives the projection operation for the video, the electronic device 100 pauses video play, and the electronic device finds the display device 102 that can be used for projection, and projects the video onto the display device 102 to continue to play the video.

In some embodiments, the electronic device 100 receives the projection operation for the video, and the electronic device 100 may discover one or more display devices that can be used for projection. The one or more display devices include the display device 102. The electronic device 100 provides a user with a selectable display device option. The user selects the display device 102 on which the user wants to perform projection. That is, the electronic device 100 receives a user operation on an option of the display device 102, and the electronic device 100 projects the video onto the display device 102 for play in response to the user operation.

Optionally, the electronic device 100 and the display device 102 may be connected to a local area network in a wired or wireless fidelity (wireless fidelity, Wi-Fi) connection manner, or may communicate with each other by using a mobile network or the Internet, or may establish a communication connection in a near field communication (Near field communication, NFC) manner.

For example, the electronic device 100 and the display device 102 may be in a same local area network. A Wi-Fi link is established between the electronic device 100 and the display device 102 by using a Wi-Fi protocol, to implement communication between the devices. Specifically, the electronic device 100 and the display device 102 establish a peer to peer (peer to peer, P2P) connection, or access a same router.

Optionally, a Bluetooth link may be further established between the electronic device 100 and the display device 102 by using a Bluetooth protocol, and communication between the devices is implemented based on the Bluetooth link. Alternatively, the electronic device 100 and the display device 102 may be interconnected by using a cellular network. Alternatively, the electronic device 100 and the display device 102 may be interconnected by using a transfer device (for example, a USB data cable or a dock device), to implement communication.

In some embodiments, when the electronic device 100 and the display device 102 are connected to a local area network of a same AP, the electronic device 100 and the display device 102 are peripheral devices or nearby devices of each other. The electronic device 100 may discover all of one or more other online devices located in a same local area network. The one or more other devices include the display device 102.

In some embodiments, when the electronic device 100 communicates with the display device 102 by using a mobile network or the Internet, the electronic device 100 may find, by using the mobile network or the Internet, that a login account of one or more other devices is an account of the electronic device 100, or the login account of the one or more other devices is an associated account of a login account of the electronic device 100. The one or more other devices include the display device 102. Devices that log in to a same account or associated accounts can obtain device information of each other to implement data communication. The associated account may be an account authorized by a same account.

The account may be an account provided by a cloud server provider for the user, for example, a Huawei account, or may be an account used to log in to an application, for example, accounts of various types of communications software or accounts of various types of payment software.

In some embodiments, the electronic device 100 receives the projection operation for the video, and the electronic device 100 may discover one or more display devices that can be used for projection. The electronic device 100 determines the display device 102 from the one or more display devices, and projects the video onto the display device 102 for play.

Optionally, the one or more display devices may feed back a current status, for example, busy, a poor network, or insufficient battery power, of the one or more display devices to the electronic device 100. Correspondingly, the electronic device 100 determines the display device 102 based on the current status of the one or more display devices, and projects the video onto the display device 102 for play.

Step S105: The electronic device 100 detects that the electronic device 100 is currently connected to the audio device 101, and the electronic device 100 sends video information corresponding to the projection operation and connection information of the audio device 101 to the display device 102.

After receiving the projection operation, the electronic device 100 detects whether the audio device is currently connected. Because the Bluetooth connection is currently established between the electronic device 100 and the audio device 101, the electronic device 100 detects that the audio device 101 is currently connected. The electronic device 100 obtains the connection information of the audio device 101, and sends the video information corresponding to the projection operation and the connection information of the audio device 101 to the display device 102. The video information is used by the display device 102 to obtain play data and play the video, and the connection information is used to establish a connection between the display device 102 and the audio device 101.

Optionally, the electronic device 100 detects whether the audio device is currently connected, and if the audio device is currently connected, sets an audio device flag bit to 1, obtains the connection information of the audio device 101, and sends the connection information to the display device 102; or if the audio device is not currently connected, sets an audio device flag bit to 0.

In some embodiments, the video information includes a video URL link, a video play time point, player member information, and the like. The video URL link is used by the display device 102 to obtain video data, including display data and audio data. The video play time point is usually a time point at which the video is projected, and is used by the display device 102 to play the video from the time point, to achieve an effect of a seamless transition from playing the video on the electronic device 100 to playing the video on the display device 102. The player member information is used by the display device 102 to open a corresponding player to play the video.

Optionally, the video information includes display data and audio data of the video, a video play time point, player member information, and the like. The display data and the audio data of the video provide display data and audio data for the display device 102.

Optionally, after receiving the projection operation, the electronic device 100 pauses video play, and a current time point is the foregoing video play time point.

In some embodiments, the electronic device 100 and the audio device 101 are connected by using Bluetooth, and the connection information of the audio device 101 includes a MAC address and a check code of the audio device 101. The MAC address is used by the display device 102 to send a Bluetooth connection request to the audio device 101. The check code is a link key (link key) in a Bluetooth connection process between the electronic device 100 and the audio device 101. The link key (link key) may be used to perform mutual authentication and encrypt exchanged data. The display device 102 may establish a Bluetooth connection to the audio device 101 based on the check code.

Optionally, the electronic device 100 sends the video information corresponding to the projection operation and the connection information of the audio device 101 to the display device 102, the electronic device 100 disconnects a Bluetooth connection to the audio device 101, and the audio device 101 is restored to an idle state, so that the display device 102 can be successfully connected to the audio device 101.

In some embodiments, after receiving the projection operation, the electronic device 100 detects whether the audio device is currently connected. If the audio device is not currently connected, the electronic device 100 sends the video information corresponding to the projection operation to the display device 102, and the display device 102 obtains the play data based on the video information and plays the video.

In some embodiments, before the electronic device 100 sends the video information corresponding to the projection operation and the connection information of the audio device 101 to the display device 102, the electronic device 100 detects that the audio device 101 is currently connected, and the electronic device 100 outputs prompt information, to prompt the user to choose whether to play the audio of the video by using the display device 102, or whether to play the audio of the video by using the audio device 101. If the electronic device 100 learns that the user chooses to play the audio of the video by using the display device 102, the electronic device 100 sends the video information to the display device 102, and does not send the connection information of the audio device 101, that is, the display device 102 does not need to establish a connection to the audio device 101. If the electronic device 100 learns that the user chooses to play the audio of the video by using the audio device 101, the electronic device 100 performs the foregoing step S105, to send the video information and the connection information of the audio device 101 to the display device 102.

Step S106: The display device 102 establishes a Bluetooth connection to the audio device 101 based on the received connection information of the audio device 101.

The display device 102 receives the video information corresponding to the projection operation and the connection information of the audio device 101, and establishes the Bluetooth connection to the audio device 101 based on the connection information.

In some embodiments, the display device 102 receives the video information corresponding to the projection operation and the connection information of the audio device 101, and the display device 102 outputs prompt information, to prompt the user to choose whether to play the audio of the video by using the display device 102, or whether to play the audio of the video by using the audio device 101. If the display device 102 learns that the user chooses to play the audio of the video by using the display device 102, the display device 102 plays a video image and outputs the audio based on the video information; or if the display device 102 learns that the user chose to play the audio of the video by using the audio device 101, the display device 102 establishes the Bluetooth connection to the audio device 101 based on the connection information.

In some embodiments, the display device 102 may actively send a page request to the audio device 101 based on the MAC address in the connection information. The audio device 101 may listen to the page request from the display device 102 at a frequency-hopping frequency in a fixed time window at a fixed cycle. After obtaining the page request from the display device 102 through listening, the audio device 101 may send a slave page response (slave page response) to the display device 102 in a next time slot. After receiving the slave page response from the audio device 101, the display device 102 may send a master page response (master page response) to the audio device 101 in a next time slot. Then, the display device 102 and the audio device 101 may enter a connected state, and establish an ACL link connection. The audio device 101 stores the link key (link key), and the display device 102 completes authentication of the link key (link key) based on the check code in the connection information. After the display device 102 completes authentication with the audio device 101, a connection (for example, an audio/video distribution transport protocol (audio/video distribution transport protocol, AVDTP)-based connection, or a hands-free profile (Hands-free Profile, HFP)-based connection for voice data transmission) used for audio data transmission may be established based on Bluetooth capability supported by the display device 102 and the audio device 101.

In some embodiments, the display device 102 parses obtained information, and if the audio device flag bit is 1, information such as the MAC address and the verification code in the connection information is parsed out, and the Bluetooth connection between the display device 102 and the audio device 101 is automatically established; or if the audio device flag bit is 0, a Bluetooth connection operation is not performed.

The Bluetooth connection is an example of a communication manner in this application, and a connection manner between the electronic device 100 and the audio device 101 may alternatively be other short-range communication such as Wi-Fi direct or radio frequency identification (RFID).

Step S107: The display device 102 displays the video based on the received video information. Step S108: The display device 102 plays the audio of the video by using the audio device 101.

The display device 102 receives the video information corresponding to the projection operation and video information of the audio device 101, and the display device 102 parses the video information. The display device 102 obtains the video data based on the video information, and plays the video. In this case, because the display device 102 establishes a connection to the audio device 101, the audio device 101 outputs the audio of the video, and the display device 102 displays the image of the video.

In some embodiments, the video information includes the video URL link, the video play time point, the player member information, and the like. The display device 102 obtains, based on the video URL link, the video data including the display data and the audio data. The display device 102 plays the video from the time point based on the video play time point. The display device 102 is configured to open, based on the player member information, a corresponding player for the display device 102 to play the video.

In some embodiments, the video information includes the display data and the audio data of the video, the video play time point, the player member information, and the like. The display data and the audio data of the video provide the display data and the audio data for the display device 102. The display device 102 displays the display data of the video, and the display device 102 plays the audio data of the video by using the audio device 101.

In some embodiments, when the display device 102 is disconnected from the audio device 101, the display device 102 may play the audio of the video through a speaker provided by the display device 102. Before the audio is played by using the display device 102, a request may be sent to the user to determine whether to play the audio through the speaker.

In some embodiments, the display device 102 obtains the video data based on the received video information, and the display device 102 may detect a resolution corresponding to the video data, and output prompt information based on the resolution corresponding to the video data, to advise the user to adjust a video resolution to an optimal resolution. For example, when a resolution that is corresponding to the video data and that is obtained by the display device 102 is 720P, the display device 102 may output prompt information: "Detect that your projection device is the living room television, and you are recommended to adjust the resolution to blue light". Optionally, the display device 102 sends a resolution adjustment instruction to the electronic device 100 based on the resolution corresponding to the video data, and the electronic device 100 outputs prompt information based on the resolution adjustment instruction, to advise the user to adjust the video resolution to the optimal resolution.

In some embodiments, in step S104, after the electronic device 100 determines the display device 102 that can be used for projection, the electronic device 100 determines, based on a device type of the determined display device 102, a resolution of a video sent to the display device 102. For example, if the electronic device 100 determines that the device type of the display device 102 is a large television screen, a video resolution by which the electronic device 100 performs projection on the display device 102 is a blue light resolution. Optionally, after determining the display device 102 that can be used for projection, the electronic device 100 determines an optimal projection resolution based on the device type of the display device 102, and the electronic device 100 outputs prompt information, to advise adjusting a resolution corresponding to video data that is sent to the optimal resolution.

In some embodiments, the display device 102 displays the video based on the received video information. A display interface of the display device 102 includes a progress bar of the video and a control option (for example, ending projection, pausing, fast forwarding, rewinding, and resolution selection). The user may control play progress of the video on the display device 102. The progress bar and the control option (for example, ending projection, pausing, fast forwarding, rewinding, and resolution selection) of the video may be retained on a video play interface of the electronic device 100. In other words, the user may also control the play progress of the video on the electronic device 100. Optionally, in a process in which the display device 102 displays the video, the electronic device 100 may synchronously display the video with the display device 102. Optionally, in a process in which the display device 102 displays the video, the electronic device 100 may not display the video, and only retain the progress bar and the control option of the video.

In some embodiments, in a process in which the display device 102 displays the video, the electronic device 100 may switch an application program of the video to a background for running. In this case, the electronic device 100 may normally use another function or another application program.

In this embodiment of this application, the electronic device 100 is connected to the audio device 101. When the electronic device 100 receives the projection instruction, the electronic device 100 disconnects from the audio device 101, and provides a projection device (the display device 102) with the video information of projection and the connection information of the audio device 101. The display device 102 may automatically establish the Bluetooth connection between the display device 102 and the audio device 101 based on the connection information of the audio device 101, so that the display device 102 is used as a carrier for video play, the audio device 101 is used as a carrier for audio output. In this way, the video is played by using the display device 102, and a sound is output from the audio device 101, so that user privacy in a public place is protected and user experience is improved.

In some scenarios, the user runs on a treadmill in a gym, and wears a Bluetooth headset to watch a video on a mobile phone. When the user wants to use a screen of the treadmill to perform audio-visual running (displaying the video on a large screen of the treadmill), the user taps projection on a mobile phone, and the current video is projected and displayed on the large screen of the treadmill. However, audio of the video is played through a speaker of the large screen of the treadmill. Consequently, another user in the gym is affected and user privacy is leaked. On the basis of this scenario, in this embodiment of this application, when the user taps projection on the mobile phone, the mobile phone automatically disconnects from the headset, and indicates a projection device (the large screen on the treadmill) to establish a connection to the headset. After the projection device (the large screen on the treadmill) establishes the connection to the headset, when the video is displayed on the large screen of the treadmill, the audio of the video is still played by the headset. This resolves a problem that the audio of the video is played by the speaker of the projection device when the user taps projection on the mobile phone when wearing the headset, so that user experience is improved.

Figure 4:
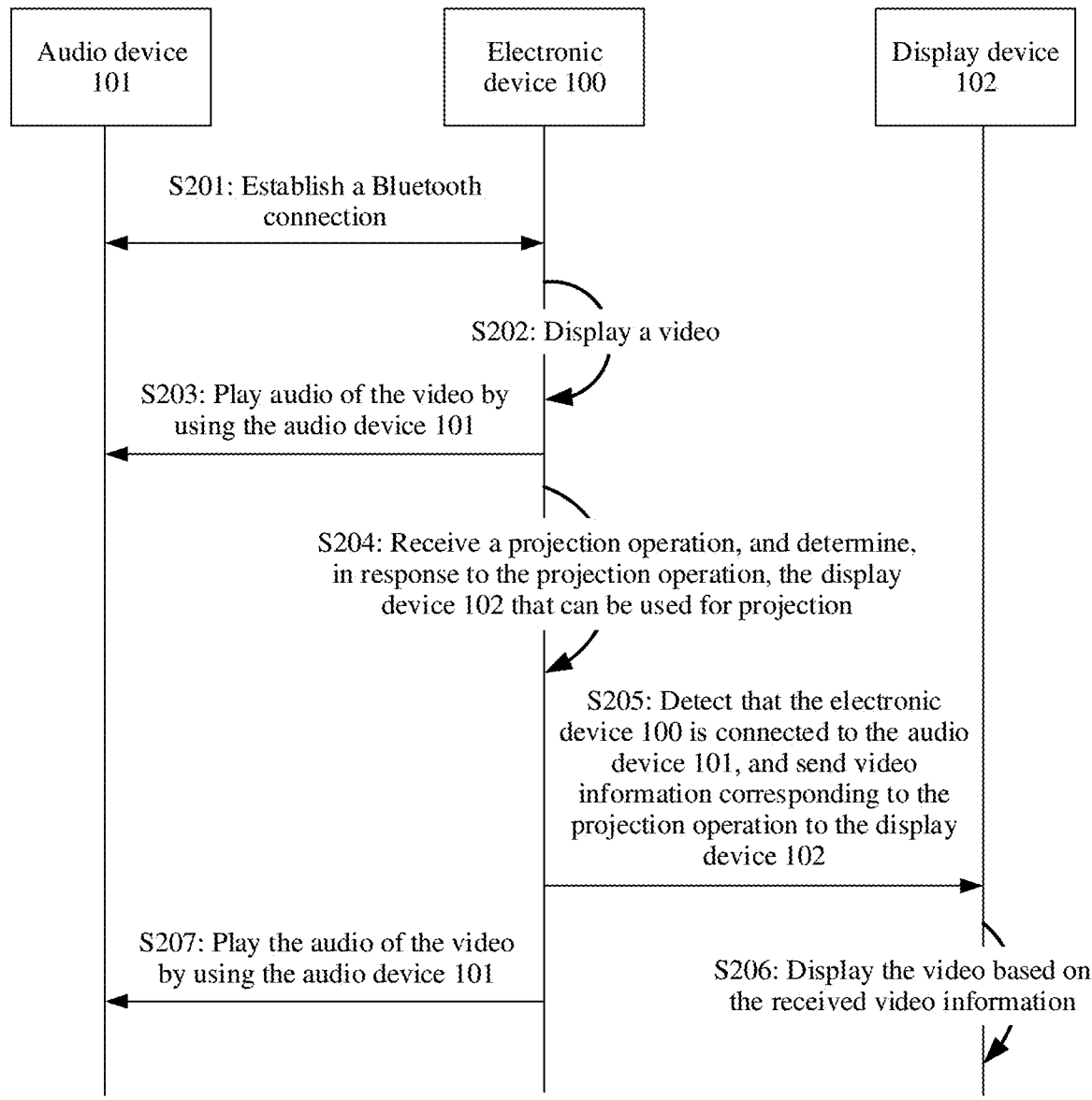
FIG. 4 is a method flowchart of another projection method according to an embodiment of this application.

FIG. 4 is a step flowchart of another projection method according to an embodiment of this application.

Step S201: An electronic device 100 establishes a Bluetooth connection to an audio device 101.

Step S202: The electronic device 100 displays a video.

Step S203: The electronic device 100 plays audio of the video by using the audio device 101.

Step S204: The electronic device 100 receives a projection operation, and determines, in response to the projection operation, a display device 102 that can be used for projection.

An implementation principle of step S201 to step S204 is the same as an implementation principle of step S101 to step S104. Therefore, for specific descriptions of step S201 to step S204, refer to step S101 to step S104. Details are not described herein again.

Step S205: The electronic device 100 detects that the audio device 101 is currently connected, and the electronic device 100 sends video information corresponding to the projection operation to the display device 102.

After receiving the projection operation, the electronic device 100 detects whether the audio device is currently connected. Because the Bluetooth connection is currently established between the electronic device 100 and the audio device 101, the electronic device 100 detects that the audio device 101 is currently connected. The electronic device 101 sends the video information corresponding to the projection operation to the display device 102. The video information is used by the display device 102 to obtain play data of the video and display an image of the video.

In some embodiments, the electronic device 100 detects whether the audio device is currently connected, and if the audio device is currently connected, sets an audio device flag bit in the video information to 1; or if the audio device is not currently connected, sets an audio device flag bit in the video information to 0.

Optionally, the video information includes a video URL link, a video play time point, player member information, and the like.

Optionally, the video information includes display data and audio data, a video play time point, player member information, and the like.

Optionally, the video information includes display data, a video play time point, player member information, and the like.

In some embodiments, the electronic device 100 detects that the audio device 101 is currently connected, and the electronic device 100 outputs prompt information, to prompt a user to choose whether to play the audio of the video by using the display device 102, or whether to play the audio of the video by using the audio device 101. If the electronic device 100 receives that the user chooses to play the audio of the video by using the display device 102, the electronic device 100 sends the video information to the display device 102, where the video information includes the video URL link, the video play time point, the player member information, and the like. Optionally, the video information includes the display data and the audio data, the video play time point, the player member information, and the like. The display device 102 displays the video image based on the obtained video information, and outputs audio through a speaker of the display device 102.

If the electronic device 100 receives that the user chooses to play the audio of the video by using the audio device 101, the electronic device 100 sends the video information to the display device 102, where the video information includes the display data, the video play time point, the player member information, and the like. The display device 102 displays the video image based on the obtained video information, and the electronic device 100 synchronously outputs the audio of the video by using the audio device 101.

Step S206: The display device 102 displays the video based on the received video information. Step S207: The electronic device 100 plays the audio of the video by using the audio device 101.

After receiving the video information, the display device 102 displays the image of the video based on the video information.

In some embodiments, the display device 102 receives the video information, and the audio device flag bit in the video information is 1, that is, it indicates that the electronic device 100 is connected to the audio device 101. Then, the display device 102 obtains the play data of the video based on the received video information and displays the image of the video, and the electronic device 100 synchronously plays the audio of the video by using the audio device 101.

Optionally, the video information includes the video URL link, the video play time point, the player member information, and the like. The display device 102 obtains, based on the video URL link, video data including the display data and the audio data. The display device 102 plays the video from the time point based on the video play time point. The display device 102 is configured to open, based on the player member information, a corresponding player for the display device 102 to play the video. The display device 102 plays the video in a mute state, that is, the display device 102 displays the image of the video, but does not output the audio data of the video. The electronic device 100 synchronously plays the audio of the video by using the audio device 101, so that an image and a sound are synchronized. Optionally, that the display device 102 plays the video in the mute state means that the display device 102 outputs the display data of the image of the video, and does not output the audio data of the video.

Optionally, the video information includes the display data, the video play time point, the player member information, and the like. The display device 102 displays the image of the video based on the video information. The electronic device 100 synchronously plays the audio of the video by using the audio device 101, so that the image and the sound are synchronized.

In some embodiments, when the display device 102 receives a user operation to unmute the mute state, the display device 102 plays the audio of the video through a speaker provided by the display device 102. Optionally, the audio device 101 pauses playing the audio of the video.

In some embodiments, when the electronic device 100 detects that a connection to the audio device 101 is disconnected, the electronic device 100 indicates the display device 102 to continue to play the audio of the video through the speaker provided by the display device 102. Optionally, the electronic device 100 sends the audio data of the video to the display device 102, to indicate the display device 102 to continue to play the audio of the video through the speaker provided by the display device 102. Before the audio is played by using the display device 102, a request may be sent to the user to determine whether to play the audio through the speaker. Optionally, the display device 102 may further be connected to an external sound box, for example, connected to the sound box in a wired or wireless manner, and play the audio by using the sound box.

In some embodiments, the display device 102 receives the video information, and the audio device flag bit in the video information is 1, that is, it indicates that the electronic device 100 is connected to the audio device 101. The display device 102 outputs the prompt information, to prompt the user to choose whether to play the audio of the video by using the display device 102, or whether to play the audio of the video by using the audio device 101. If the display device 102 receives that the user chooses to play the audio of the video by using the display device 102, the display device 102 plays the video image and outputs the audio based on the video information; or if the display device 102 receives that the user chose to play the audio of the video by using the audio device 101, the display device 102 plays the video in the mute state, and indicates the electronic device 100 to synchronously play the audio of the video by using the audio device 101, so that the image and the sound are synchronized.

In some embodiments, the display device 102 obtains the video data based on the received video information, and the display device 102 may detect a resolution corresponding to the video data, and output prompt information based on the resolution corresponding to the video data, to advise the user to adjust a video resolution to an optimal resolution. For example, when a resolution that is corresponding to the video data and that is obtained by the display device 102 is 720P, the display device 102 may output prompt information: "Detect that your projection device is the living room television, and you are recommended to adjust the resolution to blue light". Optionally, the display device 102 sends a resolution adjustment instruction to the electronic device 100 based on the resolution corresponding to the video data, and the electronic device 100 outputs prompt information based on the resolution adjustment instruction, to advise the user to adjust the video resolution to the optimal resolution.

In some embodiments, in step S204, after the electronic device 100 determines the display device 102 that can be used for projection, the electronic device 100 determines, based on a device type of the determined display device 102, a resolution of a video sent to the display device 102. For example, if the electronic device 100 determines that the device type of the display device 102 is a large television screen, a video resolution by which the electronic device 100 performs projection on the display device 102 is a blue light resolution. Optionally, after determining the display device 102 that can be used for projection, the electronic device 100 determines an optimal projection resolution based on the device type of the display device 102, and the electronic device 100 outputs prompt information, to advise adjusting a resolution corresponding to video data that is sent to the optimal resolution.

In some embodiments, the display device 102 displays the video based on the received video information. A display interface of the display device 102 includes a progress bar of the video and a control option (for example, ending projection, pausing, fast forwarding, rewinding, and resolution selection). The user may control play progress of the video on the display device 102. The progress bar and the control option (for example, ending projection, pausing, fast forwarding, rewinding, and resolution selection) of the video may be retained on a video play interface of the electronic device 100. In other words, the user may also control the play progress of the video on the electronic device 100. Optionally, in a process in which the display device 102 displays the video, the electronic device 100 may synchronously display the video with the display device 102. Optionally, in a process in which the display device 102 displays the video, the electronic device 100 may not display the video, and only retain the progress bar and the control option of the video.

In some embodiments, in a process in which the display device 102 displays the video, the electronic device 100 may switch an application program of the video to a background for running. In this case, the electronic device 100 may normally use another function or another application program.

In this embodiment of this application, the electronic device 100 is connected to the audio device 101. When the electronic device 100 receives a projection instruction, the electronic device 100 determines the display device 102 that can be used for projection. The electronic device 100 indicates the display device 102 to output only a display image, or to output a display image in a mute manner. Then, the electronic device 100 outputs the audio by using the audio device 101, so that the image and the sound are synchronized. In this way, the video is played by using the display device 102, and the sound is output from the audio device 101, so that user privacy in a public place is protected and user experience is improved.

In this embodiment of this application, the audio device 101 may alternatively be a wired headset.

In some embodiments, a manner in which the display device 102 displays the video image based on the video information may be full-screen display, split-screen display, window display (for example, floating window display), or the like. This is not limited in this application. For example, before the electronic device 100 receives the projection operation, the electronic device 100 plays a first video, and the display device 102 plays a second video. When the electronic device 100 receives the projection operation, the projection operation is used to project the first video onto the display device 102 for display. Optionally, the display device 102 stops playing the second video, and displays a display image of the first video in full screen, where audio of the first video is output by the audio device 101. Optionally, the display device 102 simultaneously plays the second video and the first video, and the second video and the first video are displayed in a split-screen manner, where audio of the second video is output by the speaker of the display device 102, and the audio of the first video is output by the audio device 101. Optionally, the display device 102 simultaneously plays the second video and the first video, and the first video is displayed over the second video in a form of a floating window, where the audio of the second video is output by the speaker of the display device 102, and the audio of the first video is output by the audio device 101.

With reference to an application scenario, the following describes an implementation form of a method that is provided in this application and that is for quickly entering an application interface on a display interface of an electronic device 100.

Figure 5A:
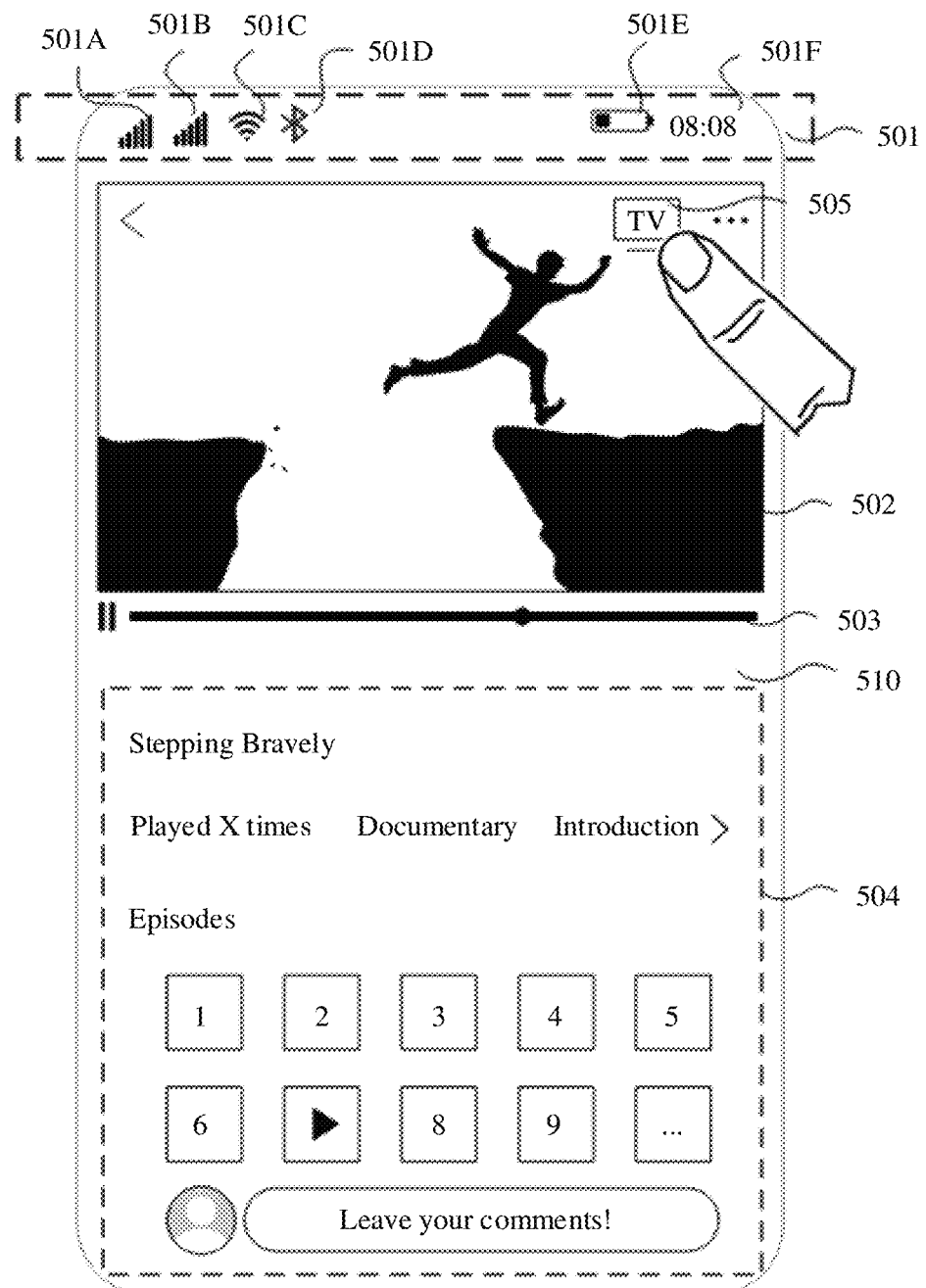
FIG. 5a to FIG. 5d are schematic diagrams of a group of application interfaces of an electronic device according to an embodiment of this application.

FIG. 5*a* shows an example of a video play interface 510. The video play interface 510 includes a status bar 501, a display area 502, a video information area 503, a progress bar 504, and one or more controls (only a control 505 is marked in FIG. 5*a*).

The status bar 501 may include one or more signal strength indicators 501A of a mobile communication signal (which may also be referred to as a cellular signal), one or more signal strength indicators 501B of a wireless fidelity (wireless fidelity, Wi-Fi) signal, a Bluetooth indicator 501C, a battery status indicator 501D, and a time indicator 501E. The Bluetooth indicator 501C indicates that Bluetooth of the electronic device 100 is enabled.

The display area 502 is configured to display a video image.

The video information area 503 is configured to indicate related information, for example, a name, an introduction, ratings, a quantity of play times, a leading actor, and an episode number, of a video displayed by a current display area 502.

The progress bar 504 is used to indicate video play progress in the display area 502. In FIG. 5*a*, the progress bar 503 is in a play state that indicates that the electronic device 100 is currently playing a video.

The control 505 is configured to implement projection. When the electronic device 100 receives a user operation on the control 505, the electronic device 100 finds, in response to the operation, a device (for example, the display device 102) that can be used for projection, and projects the video displayed in the display area 502 on the device that can be used for projection.

Figure 5B:
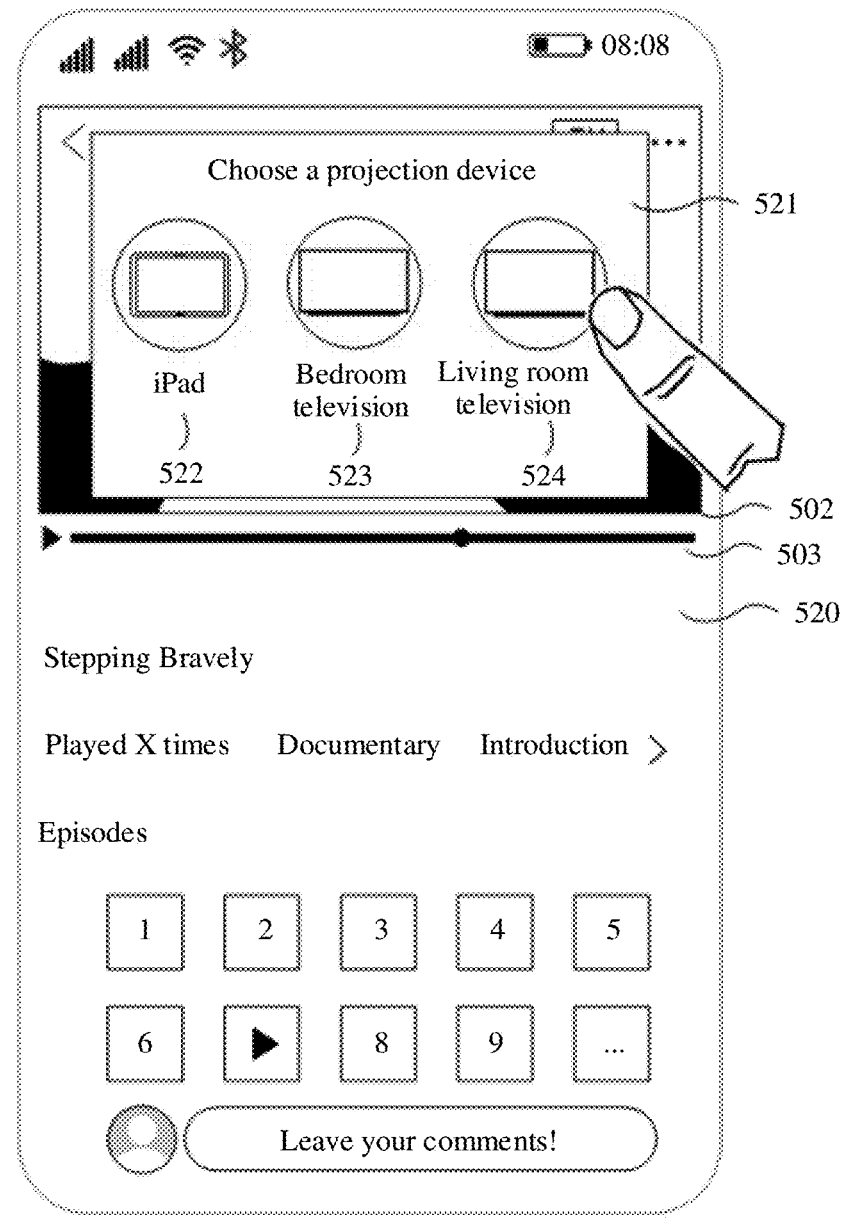

When the electronic device 100 receives the user operation on the control 505, and the electronic device 100 finds, in response to the operation, one or more devices that can be used for projection, the electronic device 100 may display a user interface 520 shown in FIG. 5*b*. The user interface 520 includes a device selection bar 521 superimposed on the display area 502.

The device selection bar 521 includes device icons corresponding to one or more devices that can be used for projection, so that a user confirms and selects a projection device. FIG. 5*b* includes an iPad device icon 522, a bedroom television device icon 523, and a living room television device icon 524. A progress bar 503 in FIG. 5*b* is in a play pause state that indicates that the electronic device 100 currently pauses video play.

In FIG. 5*b*, the electronic device 100 detects a user operation on any device icon (for example, the living room television device icon 524) in the device selection bar 521. If the electronic device 100 is currently connected to a Bluetooth audio device (for example, a Bluetooth headset), the electronic device 100 may display, in response to the operation, a user interface 530 shown in FIG. 5*c*. The user interface 530 includes a prompt bar 531 superimposed on the display area 502.

Because the electronic device 100 is currently connected to the Bluetooth audio device, after receiving the projection operation, the electronic device 100 needs to confirm, with the user, an audio output device during projection. Therefore, the electronic device 100 displays the prompt bar 531. The prompt bar 531 is used to prompt the user to confirm the audio device. For example, the prompt bar 531 shows: "Detect that the Bluetooth headset is currently connected. Are you sure you want to play the audio of the video by using the living room television during projection". The prompt bar 531 includes a confirmation control 532 and a denial control 533. When the electronic device 100 receives a user operation on the confirmation control 532, the electronic device 100 projects the video on the living room television, and the audio output device during projection is the living room television. When the electronic device 100 receives a user operation on the denial control 533, the electronic device 100 projects the video on the living room television, and the audio output device during projection is the Bluetooth headset.

Figure 5C:
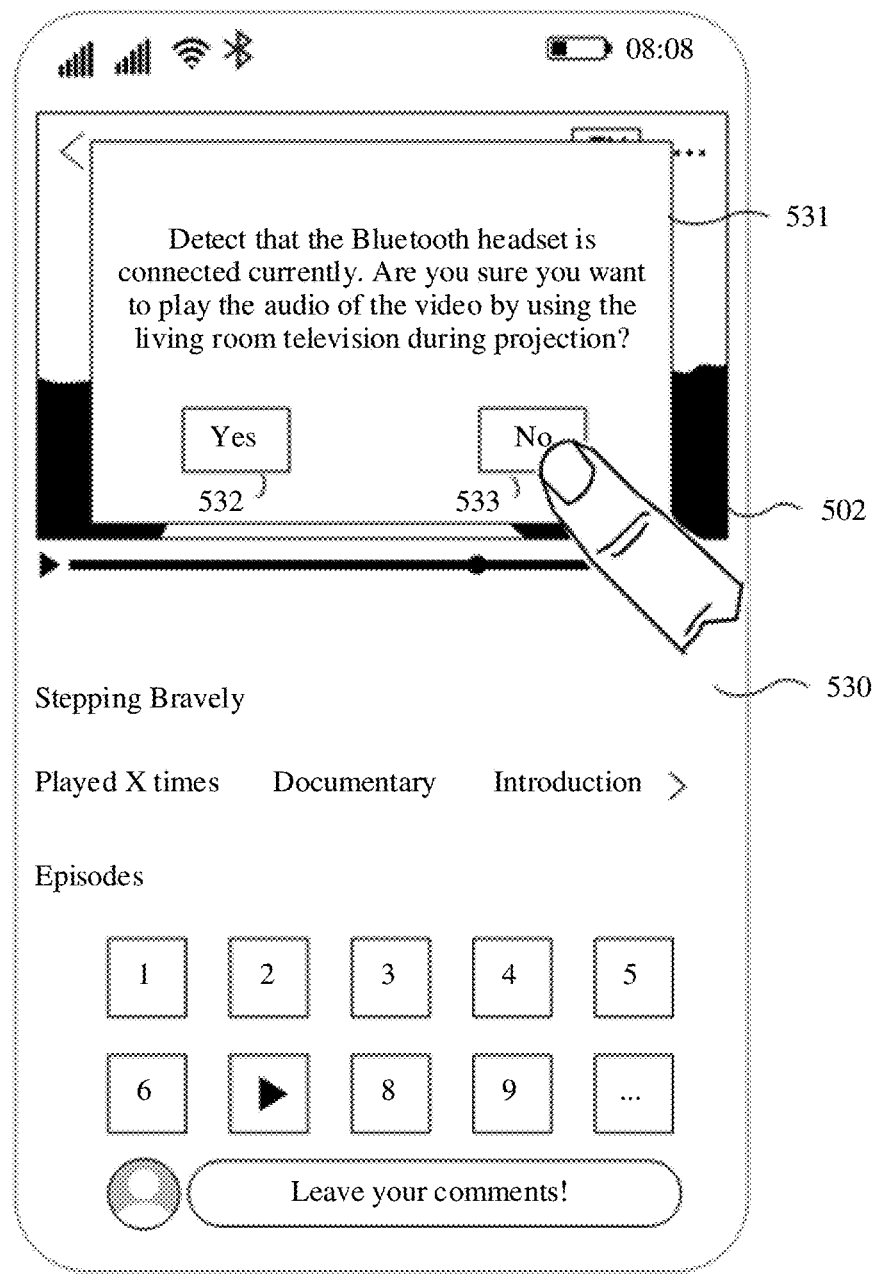
Figure 5D:
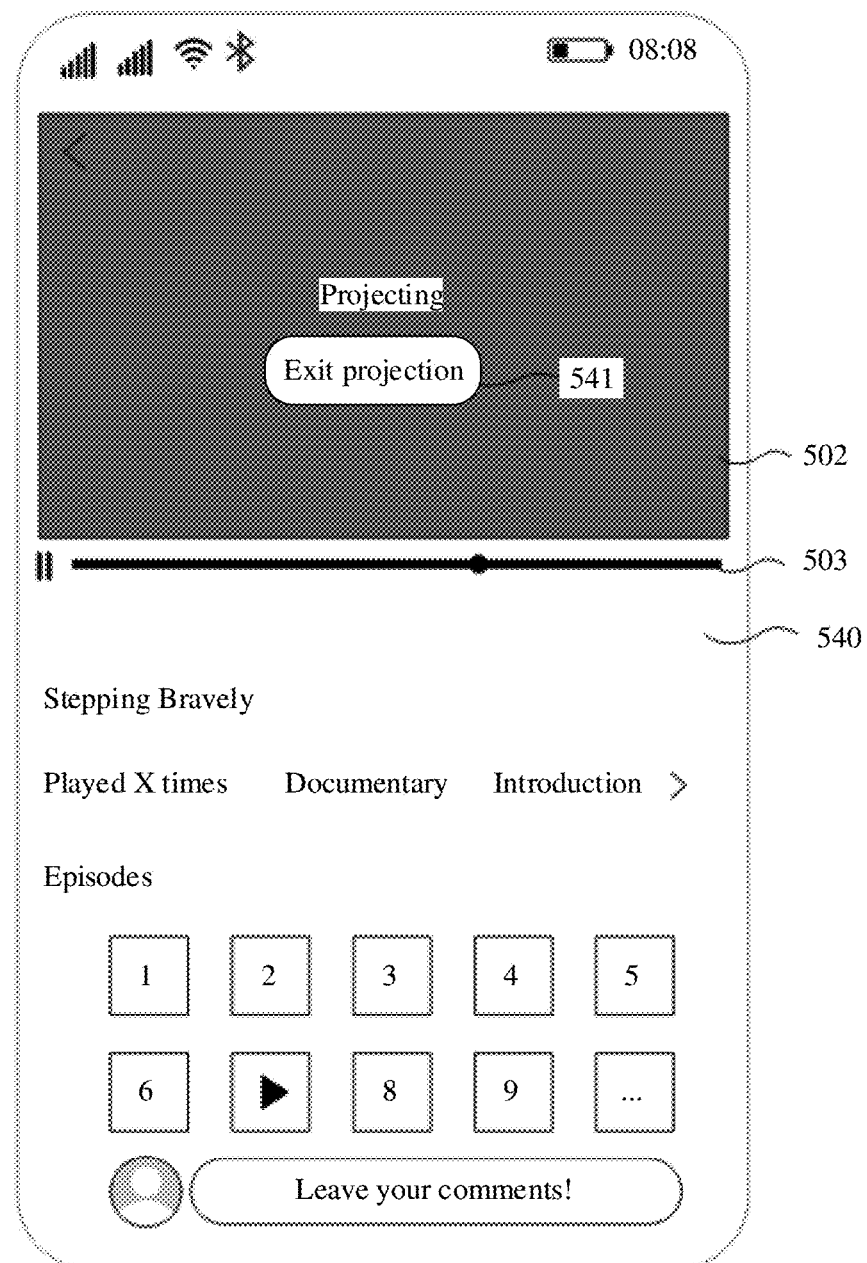

The electronic device 100 projects the video on the living room television, and the electronic device 100 may display an interface shown in FIG. 5*d*. FIG. 5*d* shows a projection interface 540. A display area 502 in the projection interface 540 no longer displays the video, the display area 502 prompts the user that a projection state is currently enabled, and the display area 502 includes a projection exit button 541. The projection exit button 541 is used to exit projection. At this time, the living room television is playing the video.

The progress bar 503 of the electronic device 100 is in the play state, and progress of the progress bar is synchronous with video play progress on the living room television. The user may control the video play progress on the living room television by controlling the progress bar 503. Optionally, FIG. 5*d* may further include a plurality of controls (not shown in the figure). The plurality of controls may be used for, for example, resolution adjustment, projection device (which currently is the display device 102) switching, and volume adjustment.

In some embodiments, FIG. 5*c* is optional. When the electronic device 100 detects that the electronic device 100 is currently connected to the audio device, the electronic device 100 still uses the audio device to output the audio during projection by default, and the electronic device 100 may directly perform projection, for example, display the interface shown in FIG. 5*d*.

Figure 6:
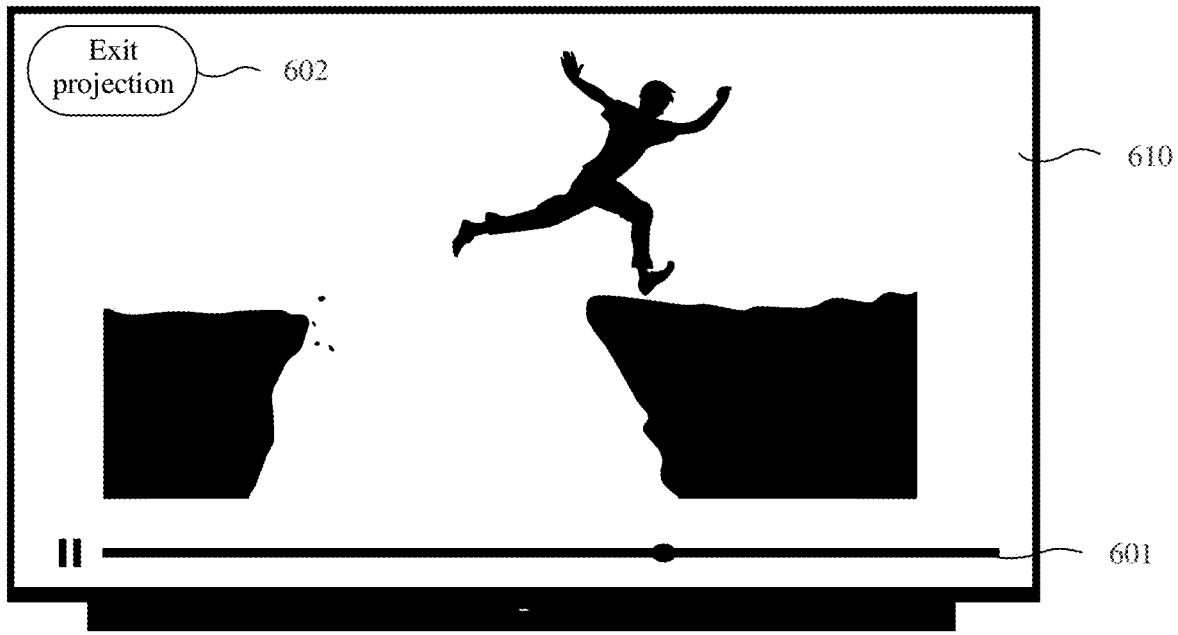
FIG. 6 to FIG. 8 are schematic diagrams of a group of application interfaces of a display device according to an embodiment of this application.

FIG. 6 shows an implementation form of a living room television (a display device 102) on a display interface.

FIG. 6 shows an example of a projection interface 610. Content displayed in the projection interface 610 is provided by an electronic device 100. The projection interface 610 further includes a progress bar 601 and a projection exit button 602.

The progress bar 601 is currently in a play state, and a user may control video play progress on a living room television by controlling the progress bar 601.

The projection exit button 602 is used to exit projection.

Figure 7:
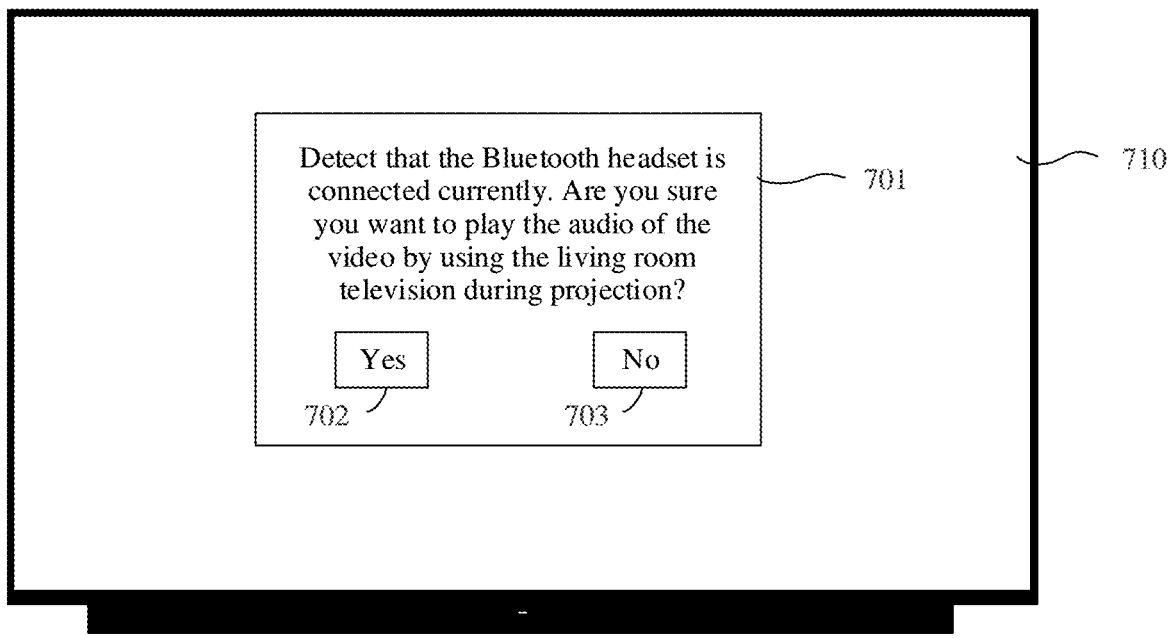

In some embodiments, before the living room television performs projection, the living room television displays an interface 710 shown in FIG. 7. The living room television receives a projection instruction sent by the electronic device 100. The living room television may display a prompt bar 701 based on the projection instruction. The prompt bar 701 is used to prompt the user to confirm an audio device. For example, the prompt bar 701 shows: "Detect that the Bluetooth headset is currently connected. Are you sure you want to play the audio of the video by using the living room television during projection". The prompt bar 701 includes a confirmation control 702 and a denial control 703. When the living room television receives a user operation on the confirmation control 702, the living room television plays the video (displays the interface shown in FIG. 6) and outputs the audio. When the living room television receives a user operation on the denial control 703, the living room television plays the video (displays the interface shown in FIG. 6) and outputs the audio by using the Bluetooth headset. Optionally, the living room television and the Bluetooth headset automatically establish a Bluetooth connection, and the audio is output by using the Bluetooth headset. Optionally, the electronic device 100 keeps the Bluetooth connection with the Bluetooth headset, the living room television plays the video in a mute manner, and the electronic device 100 outputs the audio by using the Bluetooth headset.

In some embodiments, a manner in which the display device 102 displays a video image based on video information may be full-screen display (as shown in FIG. 6), split-screen display, window display (for example, floating window display), or the like. This is not limited in this application.

Figure 8:
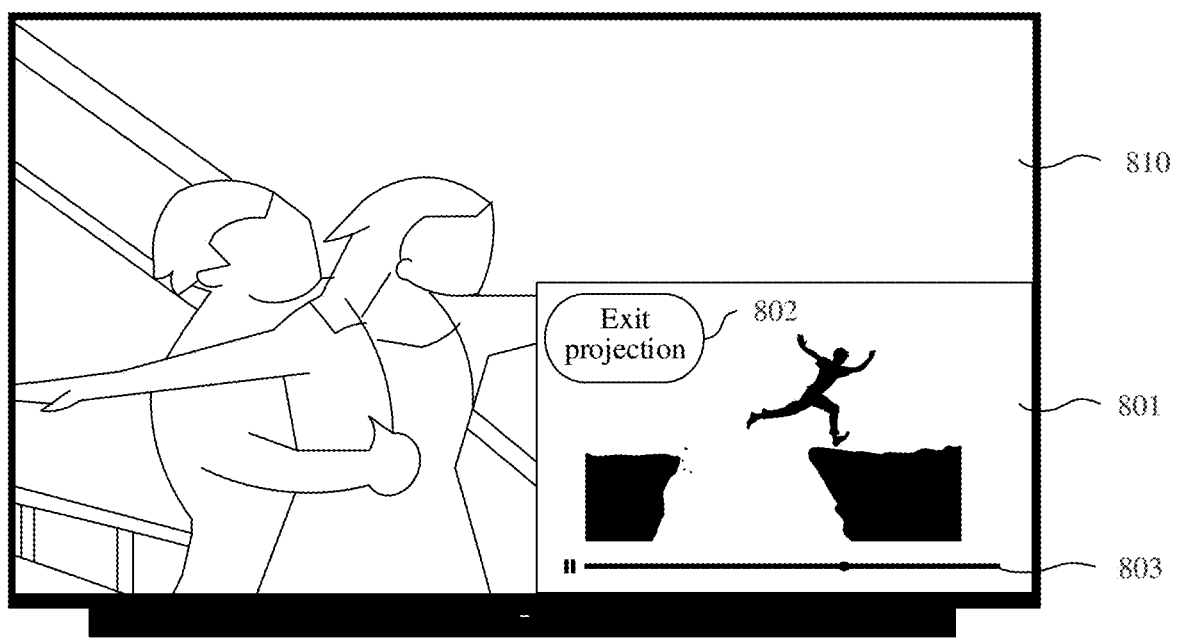

FIG. 8 shows an example of a projection interface 810 of window display. Display content in the projection interface 810 is original display content of a living room television, and a projection window 801 is displayed in a superimposed manner over the original display content. The display content in the projection window 801 is projected video data provided by an electronic device 100. The projection window 801 includes a progress bar 802 and a projection exit button 803. A user may control video play progress on the living room television by controlling the progress bar 802, and exit projection by using the projection exit button 602.

The foregoing examples are described by using video projection as an example. Further, this embodiment of this application is not limited to video projection, and various applications may be projected, or all application interfaces on the electronic device 100 are projected onto the display device 102.

Figure 9:
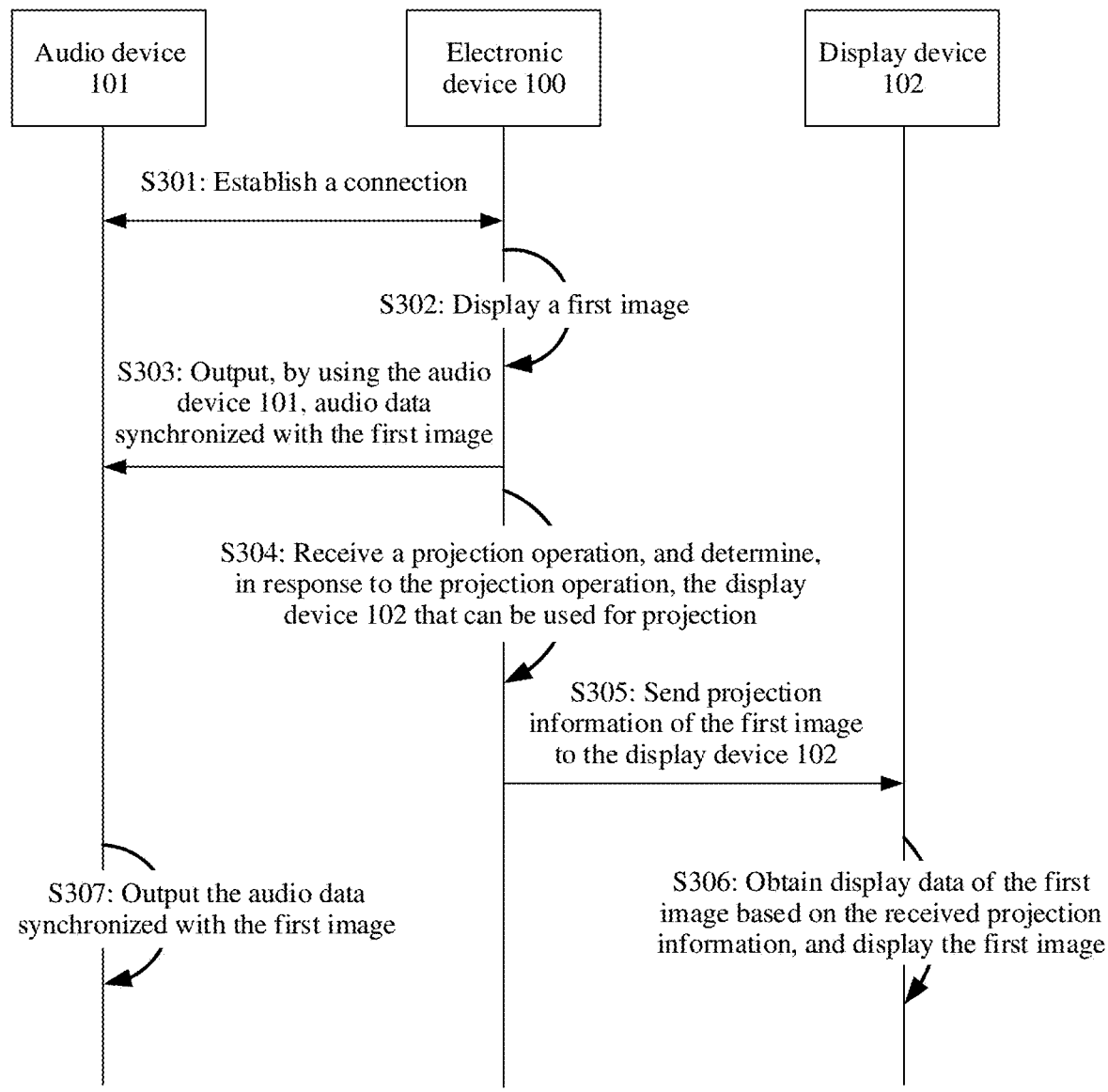
FIG. 9 is a method flowchart of another projection method according to an embodiment of this application.

FIG. 9 is a step flowchart of a projection method according to an embodiment of this application.

Step S301: An electronic device 100 establishes a connection to an audio device 101.

An implementation principle of step S301 is the same as an implementation principle of step S101. Therefore, for specific descriptions of step S301, refer to step S101. Details are not described herein again.

Step S302: The electronic device 100 displays a first image. Step S303: The electronic device 100 outputs, by using the audio device 101, audio data synchronized with the first image.

In this case, because the electronic device 100 establishes the connection to the audio device 101, the audio device 101 outputs audio synchronized with the first image, and the electronic device 100 displays the first image. The first image may be any application interface, including a video play interface, a music play interface, a communication application interface, and the like. Alternatively, the first image may be a part of a display interface in an application interface, for example, a video display area in a video play interface. Optionally, the first image may be a display image of the display area 502 in FIG. 5*a*.

When the first image is a video play interface, refer to related descriptions in FIG. 3 and FIG. 4.

Step S304: The electronic device 100 receives a projection operation, and determines, in response to the projection operation, a display device 102 that can be used for projection, where the projection operation is used to display the first image on the display device 102.

In some embodiments, the electronic device 100 sends connection information of the audio device to the display device 102 in response to the projection operation, where the connection information is used to establish a connection between the display device 102 and the audio device 101. Herein, the electronic device 100 provides the connection information of the audio device 101 for the display device 102, and the display device 102 establishes the connection to the audio device 101. In this case, the audio device 101 is a carrier for audio output of the display device 102, so that when the display device 102 displays an image, a sound is output from the audio device 101.

Optionally, the electronic device 100 disconnects from the audio device 101 in response to the projection operation.

Optionally, after the display device 102 is disconnected from the audio device 101, the audio device 101 is no longer used as the carrier for audio output of the display device 102. In this case, the audio synchronized with the first image may be output by a speaker of the display device 102.

In some embodiments, the electronic device 100 outputs first prompt information in response to the projection operation, where the first prompt information is used to prompt a user to confirm selection of the audio device 101 for outputting audio in a projection process. When receiving a confirmation operation for the first prompt information, the electronic device 100 sends the connection information of the audio device 101 to the display device 102. Herein, only when the user determines to use the audio device 101 to output the audio, the electronic device 100 provides the connection information of the audio device 101 to the display device 102, to output the audio from the audio device 101. In this way, a selection option is provided for the user, so that user experience is improved. Herein, refer to the related description in FIG. 5c. The prompt bar 531 in FIG. 5c may show the foregoing first prompt information.

Step S305: The electronic device 100 sends projection information of the first image to the display device 102.

The projection information is used by the display device 102 to obtain display data of the first image.

In some embodiments, the projection information is further used by the display device 102 to obtain the audio data synchronized with the first image. In other words, the display device 102 may obtain the display data and the audio data of the first image by using the received projection information. The display device 102 may output the first image based on the display data, and the audio data is output by the audio device 101.

In some embodiments, the projection information includes audio indication data, and the audio indication data is used to indicate the display device 102 to output the display data of the first image in a mute manner. If the electronic device 100 detects that the electronic device 100 is currently connected to the audio device 101, the electronic device 100 may indicate, based on the audio indication data, the display device 102 to output the first image in a mute manner, and then the electronic device 100 still outputs the audio of the first image by using the audio device 101. In this way, the display device 102 displays an image, and a sound is output from the audio device 101.

When the projection information includes the audio indication data, optionally, in step S304, the electronic device 100 outputs second prompt information in response to the projection operation, where the second prompt information is used to prompt a user to confirm selection of the audio device 101 for outputting audio in a projection process. When receiving a confirmation operation for the second prompt information, the electronic device 100 sends the projection information of the first image to the display device 102. Herein, only when the user determines to use the audio device 101 to output the audio, the electronic device 100 provides projection information that carries the audio indication data to the display device 102, to indicate the display device 102 to output the first image in a mute manner, and then the audio device 101 still outputs the audio of the first image. In this way, a selection option is provided for the user, and user experience is improved. Herein, refer to the related description in FIG. 5c. The prompt bar 531 in FIG. 5c may show the foregoing second prompt information.

Optionally, when the display device 102 receives an unmuting instruction, the audio synchronized with the first image is output by the speaker of the display device 102. Optionally, the audio device 101 no longer outputs the audio synchronized with the first image.

Optionally, when the electronic device 100 detects that the connection to the audio device 101 is disconnected, the electronic device 100 indicates the display device 102 to continue to play the audio synchronized with the first image through the speaker provided by the display device 102. Optionally, the electronic device 100 sends the audio data synchronized with the first image to the display device 102, to indicate the display device 102 to continue to play, through the speaker provided by the display device 102, the audio synchronized with the first image. Optionally, the display device 102 may further be connected to an external sound box, for example, connected to the sound box in a wired or wireless manner, and play the audio by using the sound box.

In some embodiments, the projection information includes audio indication data, the audio indication data indicates that the electronic device 100 is connected to the audio device, and the audio indication data is used to indicate the display device 102 to prompt a user to confirm selection of the audio device for outputting audio in a projection process. If the electronic device 100 detects that the electronic device 100 is currently connected to the audio device 101, the electronic device 100 may indicate, based on the audio indication data, the display device 102 that the electronic device 100 is connected to the audio device, and then the display device 102 determines whether to output the audio by using the audio device. Optionally, the display device 102 outputs third prompt information based on the audio indication data, where the third prompt information is used to prompt a user to confirm selection of the audio device 101 for outputting audio in a projection process. The display device 102 receives a confirmation operation for the third prompt information, and outputs the display data of the first image in a mute manner. The display device 102 may output the prompt information to the user, so that the user confirms use of the audio device 101 for outputting the audio. In this way, a selection option is provided for the user, so that user experience is improved. Herein, refer to the related description in FIG. 7. The prompt bar 701 in FIG. 7 may show the foregoing third prompt information.

Step S306: The electronic device 100 obtains the display data of the first image based on the received projection information, and displays the first image. Step S307: The audio device 101 outputs the audio data synchronized with the first image.

In this embodiment of this application, when the electronic device 100 is connected to the audio device 101, the audio device 101 is a carrier for audio output of the electronic device 100. When the electronic device 100 receives a projection instruction, the electronic device 100 uses the display device 102 as a carrier for image display, and the audio device 101 is still used as the carrier for audio output. In this way, the display device 102 displays an image, and a sound is output from the audio device 101, so that user privacy in a public place is protected and user experience is improved.

In some embodiments, display content of the first image is a video image of a first video displayed in full screen, the first image includes a progress bar of the first video, the progress bar is used to control play progress of the first video, and the projection information of the first image is used to obtain display data and audio data of the first video. A specific example is provided herein, that is, the first image may be a video image of the first video. When the electronic device 100 projects the first video onto the display device 102, the display data of the first video is output by the display device 102, and the audio data of the first video is output by the audio device 101.

In some embodiments, after the electronic device 100 sends the projection information of the first image to the display device 102, the electronic device 100 receives a user operation on the progress bar of the first image. The electronic device 100 controls the play progress of the first video on the display device 102 based on the user operation. When the electronic device 100 projects the first video onto the display device 102, the user may control the play progress of the first video on the electronic device 100, or the user may control the play progress of the first video on the display device 102. Herein, refer to related descriptions in FIG. 5d and FIG. 6.

In some embodiments, the display device 102 displays a second image before outputting the display data of the first image. After receiving the projection information sent by the electronic device 100, the display device 102 displays the second image and the first image. The first image is displayed over the second image in a form of a floating window. Audio data synchronized with the second image is output by the display device, and the audio data synchronized with the first image is output by the audio device. A display form of displaying the first image in a floating window is described herein, that is, the display device 102 simultaneously displays the second image and the first image, where the second image is an original display image of the display device 102, and the first image is an image projected by the electronic device 100 onto the display device 102. The first image is displayed over the second image in a form of a floating window. Audio data synchronized with the second image is output by a speaker of the display device 102, and the audio data synchronized with the first image is output by the audio device 101. Herein, refer to related descriptions in FIG. 8. Optionally, a display manner of the first image may be full-screen display, split-screen display, window display, or the like. This is not limited in this application.

All or some of the foregoing embodiments may be implemented by using software, hardware, firmware, or any combination thereof. When software is used to implement embodiments, all or a part of embodiments may be implemented in a form of a computer program product. The computer program product includes one or more computer instructions. When the computer program instructions are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

A person of ordinary skill in the art may understand that all or some of the processes of the methods in embodiments may be implemented by a computer program instructing related hardware. The program may be stored in a computer-readable storage medium. When the program runs, the processes of the methods in embodiments are performed. The foregoing storage medium includes any medium that can store program code, such as a ROM, a random access memory RAM, a magnetic disk, or an optical disc.

What is claimed is:

1. A method, comprising:
   establishing, by an electronic device, a connection to an audio device, wherein the audio device is configured to output audio of the electronic device;
   displaying, by the electronic device, a first image, wherein audio data synchronized with the first image is output by the audio device;
   receiving, by the electronic device, a projection operation, wherein the projection operation indicates to project the first image onto a display device;
   sending, by the electronic device, projection information of the first image to the display device in response to receiving the projection operation, wherein the projection information is used by the display device to obtain display data of the first image, the display data of the first image is output by the display device, and the audio data synchronized with the first image is output by the audio device; and
   sending, by the electronic device, connection information of the audio device to the display device in response to receiving the projection operation, wherein the connection information is used to establish a connection between the display device and the audio device.

2. The method according to claim 1, wherein the projection information is further used by the display device to obtain the audio data synchronized with the first image.

3. The method according to claim 1, further comprising:
   disconnecting, by the electronic device, from the audio device in response to receiving the projection operation.

4. The method according to claim 1, wherein sending, by the electronic device, the connection information of the audio device to the display device in response to receiving the projection operation comprises:
   outputting, by the electronic device, first prompt information in response to receiving the projection operation, wherein the first prompt information prompts a user to confirm selection of the audio device for outputting audio in a projection process; and
   when receiving a confirmation operation for the first prompt information, sending, by the electronic device, the connection information of the audio device to the display device.

5. The method according to claim 1, wherein the projection information comprises audio indication data, and the audio indication data indicates to the display device to output the display data of the first image in a mute manner.

6. The method according to claim 5, wherein sending, by the electronic device, the projection information of the first image to the display device in response to receiving the projection operation comprises:
   outputting, by the electronic device, second prompt information in response to receiving the projection operation, wherein the second prompt information prompts a user to confirm selection of the audio device for outputting audio in a projection process; and
   when receiving a confirmation operation for the second prompt information, sending, by the electronic device, the projection information of the first image to the display device.

7. The method according to claim 1, wherein the projection information comprises audio indication data, the audio indication data indicates that the electronic device is connected to the audio device, and the audio indication data indicates to the display device to prompt a user to confirm selection of the audio device for outputting audio in a projection process.

8. The method according to claim 1, wherein display content of the first image is a video image of a first video displayed in full screen, the first image comprises a progress bar of the first video, the progress bar is used to control play progress of the first video, and the projection information of the first image is used to obtain display data and audio data of the first video.

9. The method according to claim 8, wherein after sending, by the electronic device, the projection information of the first image to the display device, the method further comprises:
  receiving, by the electronic device, a user operation on the progress bar in the first image; and
  controlling, by the electronic device, the play progress of the first video on the display device based on the user operation.

10. A system, comprising:
  an electronic device;
  an audio device; and
  a display device;
  wherein the electronic device establishes a connection to the audio device, the electronic device is configured to display a first image, and the audio device is configured to output audio data synchronized with the first image;
  wherein the electronic device is further configured to:
    receive a projection operation, wherein the projection operation indicates to project the first image onto the display device; and
    send projection information of the first image to the display device in response to receiving the projection operation;
  wherein the display device is further configured to:
    obtain display data of the first image based on the projection information; and
    display the first image based on the display data of the first image;
  wherein the audio device is further configured to continue to output the audio data synchronized with the first image;
  wherein the electronic device is further configured to send connection information of the audio device to the display device in response to receiving the projection operation; and
  wherein the display device is further configured to establish a connection to the audio device based on the connection information.

11. The system according to claim 10, wherein the display device is further configured to obtain, based on the projection information, the audio data synchronized with the first image.

12. The system according to claim 10, wherein the electronic device is further configured to disconnect from the audio device in response to the projection operation.

13. The system according to claim 10, wherein the electronic device is further configured to:
  output first prompt information in response to receiving the projection operation, wherein the first prompt information prompts a user to confirm selection of the audio device for outputting audio in a projection process; and
  when receiving a confirmation operation for the first prompt information, send the connection information of the audio device to the display device.

14. The system according to claim 10, wherein the display device is further configured to:
  disconnect from the audio device after outputting the display data of the first image; and
  output audio synchronized with the first image.

15. The system according to claim 10, wherein the projection information comprises audio indication data, and the audio indication data indicates to the display device to output the display data of the first image in a mute manner.

16. The system according to claim 15, wherein the display device is further configured to:
  receive an unmuting instruction after outputting the display data of the first image; and
  output audio synchronized with the first image.

17. The system according to claim 15, wherein the electronic device is further configured to:
  output second prompt information in response to receiving the projection operation, wherein the second prompt information prompts a user to confirm selection of the audio device for outputting audio in a projection process; and
  when receiving a confirmation operation for the second prompt information, send the projection information of the first image to the display device.

18. The system according to claim 10, wherein the projection information comprises audio indication data, and the audio indication data indicates that the electronic device is connected to the audio device; and
  wherein the display device is further configured to:
    output third prompt information based on the audio indication data, wherein the third prompt information prompts a user to confirm selection of the audio device for outputting audio in a projection process; and
    when receiving a confirmation operation for the third prompt information, output the display data of the first image in a mute manner.

19. The system according to claim 10, wherein display content of the first image is a video image of a first video displayed in full screen, the first image comprises a progress bar of the first video, the progress bar is used to control play progress of the first video, and the projection information of the first image is used to obtain display data and audio data of the first video.

20. An electronic device, comprising one or more processors and one or more memories, wherein the one or more memories store program code, the program code comprises instructions, and when the instructions are run on the one or more processors, the electronic device performs operations comprising:
  establishing a connection to an audio device, wherein the audio device is configured to output audio of the electronic device;
  displaying a first image, wherein audio data synchronized with the first image is output by the audio device;
  receiving a projection operation, wherein the projection operation indicates to project the first image onto a display device;
  sending projection information of the first image to the display device in response to receiving the projection operation, wherein the projection information is used by the display device to obtain display data of the first image, the display data of the first image is output by the display device, and the audio data synchronized with the first image is output by the audio device; and
  sending connection information of the audio device to the display device in response to receiving the projection operation, wherein the connection information is used to establish a connection between the display device and the audio device.

* * * * *